(12) United States Patent
Yankovich et al.

(10) Patent No.: US 11,360,790 B2
(45) Date of Patent: Jun. 14, 2022

(54) COLLABORATIVE AND NON-COLLABORATIVE WORKSPACE APPLICATION CONTAINER WITH APPLICATION PERSISTENCE

(71) Applicant: Adobe Inc., San Jose, CA (US)

(72) Inventors: Steven P. Yankovich, Pleasanton, CA (US); Matthias Zeller, Palo Alto, CA (US); Daniel McWeeney, Brooklyn, NY (US)

(73) Assignee: Adobe Inc., San Jose, CA (US)

( * ) Notice: Subject to any disclaimer, the term of this patent is extended or adjusted under 35 U.S.C. 154(b) by 279 days.

(21) Appl. No.: 16/655,927

(22) Filed: Oct. 17, 2019

(65) Prior Publication Data

US 2020/0050464 A1 Feb. 13, 2020

Related U.S. Application Data

(62) Division of application No. 12/276,196, filed on Nov. 21, 2008, now Pat. No. 10,474,477.

(60) Provisional application No. 61/104,679, filed on Oct. 10, 2008.

(51) Int. Cl.
*G06F 9/445* (2018.01)

(52) U.S. Cl.
CPC .................. *G06F 9/4451* (2013.01)

(58) Field of Classification Search
None
See application file for complete search history.

(56) References Cited

U.S. PATENT DOCUMENTS

| | | | | |
|---|---|---|---|---|
| 5,072,412 | A | * 12/1991 | Henderson, Jr. | ...... G06F 3/0481 715/804 |
| 5,107,443 | A | * 4/1992 | Smith | ...... G06Q 10/10 713/166 |
| 5,233,687 | A | 8/1993 | Henderson, Jr. et al. | |
| 5,339,392 | A | 8/1994 | Risberg et al. | |
| 5,488,686 | A | * 1/1996 | Murphy | ...... G06F 9/54 715/753 |
| 5,995,096 | A | 11/1999 | Kitahara et al. | |
| 5,995,106 | A | 11/1999 | Naughton et al. | |
| 6,131,096 | A | 10/2000 | Ng et al. | |

(Continued)

OTHER PUBLICATIONS

Actionscript.org, "ActionScript.org Flash, Flex and ActionScript Resources." Published Nov. 21, 2003. Retrieved on Nov. 16, 2008, from the Internet: http://www.actionscript.org/resources/articles/336/1/Macromedia-Central-Developer-Release-now-available/Page1.html.

(Continued)

*Primary Examiner* — Henry Orr
(74) *Attorney, Agent, or Firm* — Finch & Maloney PLLC

(57) ABSTRACT

Collaborative and non-collaborative work spaces can each be defined by a workspace definition that includes a workspace identifier referring to a workspace where an application container having a user interface can instantiate the workspace based on the workspace definition, and a collection of application identifiers each referring to an application provider for an application. Each application can be configured to execute in the application container for the instantiated workspace, and each application can have a visual representation in the user interface. The workspace definition can also include one or more participants, where each participant refers to one or more workspace participants.

20 Claims, 17 Drawing Sheets

(56) References Cited

U.S. PATENT DOCUMENTS

| | | | |
|---|---|---|---|
| 6,173,315 B1 | 1/2001 | Deleeuw | |
| 6,314,428 B1* | 11/2001 | Brew | G06F 9/44505 |
| 6,329,984 B1 | 12/2001 | Boss et al. | |
| 6,564,246 B1* | 5/2003 | Varma | G06Q 10/10 |
| | | | 709/205 |
| 6,615,258 B1 | 9/2003 | Barry et al. | |
| 6,629,129 B1 | 9/2003 | Bookspan et al. | |
| 6,671,855 B1* | 12/2003 | Hayashi | G06Q 10/10 |
| | | | 715/767 |
| 6,816,882 B1 | 11/2004 | Conner et al. | |
| 6,886,041 B2 | 4/2005 | Messinger et al. | |
| 7,003,728 B2 | 2/2006 | Berque | |
| 7,051,071 B2 | 5/2006 | Stewart et al. | |
| 7,051,072 B2 | 5/2006 | Stewart et al. | |
| 7,093,005 B2 | 8/2006 | Martin | |
| 7,124,164 B1 | 10/2006 | Chemtob | |
| 7,143,186 B2 | 11/2006 | Stewart et al. | |
| 7,197,530 B2 | 3/2007 | Mehra et al. | |
| 7,240,280 B2 | 7/2007 | Jolley et al. | |
| 7,249,157 B2 | 7/2007 | Stewart et al. | |
| 7,530,022 B2 | 5/2009 | Ben-Shachar et al. | |
| 7,640,511 B1 | 12/2009 | Keel et al. | |
| 7,703,036 B2 | 4/2010 | Sai et al. | |
| 8,104,044 B1 | 1/2012 | Scofield et al. | |
| 8,214,747 B1 | 7/2012 | Yankovich et al. | |
| 8,429,540 B1 | 4/2013 | Yankovich et al. | |
| 2002/0018078 A1 | 2/2002 | Khan et al. | |
| 2002/0049786 A1 | 4/2002 | Bibliowicz et al. | |
| 2002/0065848 A1 | 5/2002 | Walker et al. | |
| 2003/0018714 A1 | 1/2003 | Mikhailov et al. | |
| 2003/0189597 A1 | 10/2003 | Anderson et al. | |
| 2004/0003371 A1 | 1/2004 | Coulthard et al. | |
| 2004/0015783 A1 | 1/2004 | Lennon et al. | |
| 2004/0024819 A1 | 2/2004 | Sasaki et al. | |
| 2004/0122928 A1 | 6/2004 | Arcand | |
| 2004/0187140 A1 | 9/2004 | Aigner et al. | |
| 2004/0255289 A1 | 12/2004 | Alex George et al. | |
| 2005/0033817 A1 | 2/2005 | Wei | |
| 2005/0188329 A1 | 8/2005 | Cutler et al. | |
| 2005/0198201 A1 | 9/2005 | Bohn et al. | |
| 2006/0010125 A1 | 1/2006 | Beartusk et al. | |
| 2006/0075141 A1 | 4/2006 | Boxenhorn | |
| 2006/0116994 A1 | 6/2006 | Jonker et al. | |
| 2006/0129935 A1 | 6/2006 | Deinlein et al. | |
| 2007/0124373 A1* | 5/2007 | Chatterjee | G06Q 10/10 |
| | | | 709/204 |
| 2007/0124374 A1 | 5/2007 | Arun et al. | |
| 2007/0168340 A1* | 7/2007 | Mahoney | G06Q 10/10 |
| 2007/0168720 A1 | 7/2007 | Chatterjee et al. | |
| 2007/0198534 A1 | 8/2007 | Hon et al. | |
| 2007/0220614 A1 | 9/2007 | Ellis et al. | |
| 2007/0239859 A1* | 10/2007 | Wilkinson | H04L 63/08 |
| | | | 709/220 |
| 2007/0255712 A1* | 11/2007 | Mahoney | G06F 16/182 |
| 2008/0034314 A1 | 2/2008 | Louch et al. | |
| 2008/0046442 A1 | 2/2008 | Grason et al. | |
| 2008/0126944 A1 | 5/2008 | Curtis et al. | |
| 2008/0134018 A1 | 6/2008 | Kembel et al. | |
| 2009/0006936 A1 | 1/2009 | Parker et al. | |
| 2009/0083656 A1 | 3/2009 | Dukhon et al. | |
| 2009/0094339 A1 | 4/2009 | Allen et al. | |
| 2009/0164994 A1* | 6/2009 | Vasilevsky | G06F 9/45533 |
| | | | 718/1 |
| 2009/0249359 A1 | 10/2009 | Gaunter et al. | |
| 2009/0254406 A1 | 10/2009 | Sichart et al. | |
| 2009/0254912 A1 | 10/2009 | Roundtree et al. | |
| 2009/0265634 A1 | 10/2009 | Beringer et al. | |
| 2009/0300725 A1 | 12/2009 | Carney | |
| 2009/0320035 A1 | 12/2009 | Ahlgren et al. | |
| 2009/0327302 A1 | 12/2009 | Richardson et al. | |
| 2009/0327405 A1 | 12/2009 | Fitzgerald et al. | |
| 2010/0037151 A1 | 2/2010 | Ackerman et al. | |
| 2010/0100605 A1 | 4/2010 | Allen et al. | |
| 2010/0100626 A1 | 4/2010 | Allen et al. | |
| 2010/0122196 A1 | 5/2010 | Wetzer et al. | |
| 2010/0192072 A1 | 7/2010 | Spataro et al. | |
| 2011/0029907 A1 | 2/2011 | Bakhash | |

OTHER PUBLICATIONS

Apple Insider Staff, Apple's App Store launches with more than 500 apps, Jul. 10, 2008, downloaded Nov. 24, 2017, http://appleinsider.com/articles/08/07/1 0/apples_app_store_launches_with_more_than_500_apps.

BEA Systems, Inc. "BEA AquaLogic Interaction Collaboration." Product Data Sheet, pp. 4.

Becker, David "Macromedia Frees Flash From the Browser" CNET News Published Mar. 26, 2003. Retrieved on Nov. 16, 2008, from the Internet: http://news.cnet.com/2100-1046-994258.html.

Microsoft TechNet. "Deploying and Supporting Enterprise Search." Technical White Paper. Published Jul. 19, 2007. Retrieved on Jun. 17, 2008, from the Internet: http://technet.microsoft.com/en-us/library/bb735129(printer ).aspx.

Microsoft TechNet. "White Papers: Information Architecture in Office SharePoint Server." 2008. Retrieved on Jun. 17, 2008, from the Internet: http://technet microsoft com/en-us/library/cc262985(printer).aspx.

Microsoft TechNet. "White Papers: Role-based My Site Template Setup Guides." 2008. Retrieved on Jun. 17, 2008, from the Internet: http://technet.microsoft.com/en-us/library/cc263453(printer).aspx.

Microsoft. "Creating Business Value Through Better Collaboration—a Microsoft White Paper." 2005, pp. 12.

Microsoft. "Microsoft and EMC: Managing Content Across an Enterprise." A Microsoft and EMC White Paper. Published Jun. 2007, pp. 10.

Wikipedia. "Macromedia Central." Retrieved on Nov. 16, 2008, from the Internet: http://en.wikipedia.org/w/index.php? title=Macromedia Central&printable.

* cited by examiner

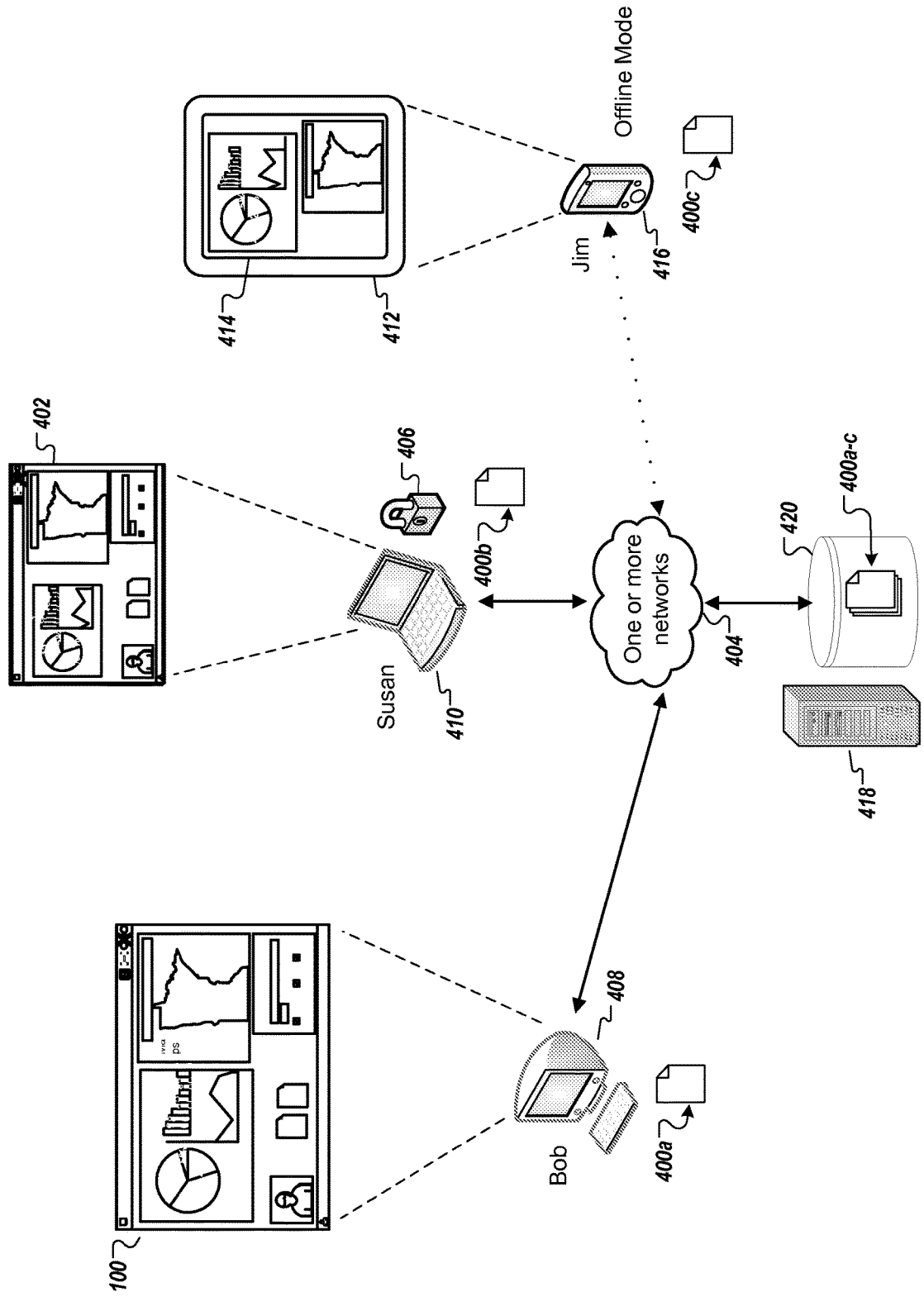

COLLABORATIVE AND NON-COLLABORATIVE WORKSPACE APPLICATION CONTAINER WITH APPLICATION PERSISTENCE

CROSS-REFERENCE TO RELATED APPLICATIONS

This is a divisional of U.S. patent application Ser. No. 12/276,196 (filed 21 Nov. 2008), which claims the benefit of U.S. Provisional Patent Application 61/104,679 (filed 10 Oct. 2008). The entire disclosure of both of these applications is hereby incorporated by reference herein.

BACKGROUND

The present disclosure relates to software for collaborative and non-collaborative workspaces.

SUMMARY

In general, one aspect of the subject matter described in this specification can be embodied in computer-readable medium comprising a workspace definition, the workspace definition including a workspace identifier referring to a workspace where an application container having a user interface can instantiate the workspace based on the workspace definition; a plurality of application identifiers each referring to an application provider for an application, and where each application is configured to execute in the application container for the instantiated workspace and where each application has a visual representation in the user interface; and a one or more participants where each participant refers to one or more workspace participants.

These and other embodiments can optionally include one or more of the following features. The workspace participant is associated with a respective role associated with one or more privileges. The workspace participants are stored on a server. The workspace participants are stored in the workspace definition. The workspace further comprises one or more documents and where each of the one or more documents are accessible through the user interface. A document in the one or more documents is a preview of a first document. A document in the one or more documents is a version of a first document and where the document can be rendered without an application that created the first document. The workspace definition further comprises state information for the plurality of applications that describes the state of each application in the workspace. The state information describes one or more aspects of each application's respective visual representation.

In general, one aspect of the subject matter described in this specification can be embodied in a method that includes receiving a workspace definition comprising a plurality of application identifiers, application state information, and a one or more participants each referring to a respective workspace participant. In response to the receiving: 1) for each application identifier, executing within an application container a respective application referred to by the application identifier, the application container having a user interface, and where execution of the respective application within the application container creates a respective visual representation in the user interface; 2) arranging the respective visual representations together in the user interface according to the application state information; and 3) selecting a workspace participant as the current participant and determining the current participant's privileges based on a respective role associated with the selected workspace participant. Other embodiments of this aspect include corresponding systems, apparatus, and computer program products.

These and other embodiments can optionally include one or more of the following features. For one or more of the plurality of application identifiers, obtaining the respective application referred to by the application identifier from an application provider referred to by the application identifier. The application container comprises a virtual machine which is configured to execute the applications referred to by the plurality of application identifiers. The role allows the current participant to modify the workspace definition. The current participant can prevent other participants from modifying one or more portions of the workspace definition. The modifications are propagated to workspace definitions associated with one or more other participants. In some cases the propagating is performed by one or more servers. A second role prevents the current participant from modifying the plurality of application identifiers and the one or more participants. The user interface comprises a plurality of panels and where each application's respective visual representation is created in one of the plurality of panels.

In general, one aspect of the subject matter described in this specification can be embodied in a method that includes receiving a workspace definition comprising a plurality of application identifiers and a one or more participants each referring to a respective workspace participant; for each application identifier, executing within an application container a respective application referred to by the application identifier, the application container having a user interface, and where execution of the respective application in the application container creates a respective visual representation in the user interface; and determining by a first respective application executing within the application container a role for a current participant and selecting a set of application features to enable for the first application based on the role. Other embodiments of this aspect include corresponding systems, apparatus, and computer program products.

These and other embodiments can optionally include one or more of the following features. The set of application features to enable is all application features. The set of application features to enable is a subset of all application features. Input directed to a user interface is accepted to enable additional application features. A service associated with an owner is communicated with to enable additional application features.

In general, one aspect of the subject matter described in this specification can be embodied in a method that includes receiving a command to create a new workspace and creating a workspace identifier for the workspace, where an application container having a user interface can instantiate the workspace; and receiving one or more applications to execute in the workspace and creating an application identifier for each application that refers to an application provider for the application, and where each application is configured to execute in the application container and where each executing application has a visual representation in the user interface. Other embodiments of this aspect include corresponding systems, apparatus, and methods.

These and other embodiments can optionally include one or more of the following features. Receiving one or more documents for the workspace where each of the one or more documents is accessible through the user interface. Receiving one or more workspace participants for the workspace. Publishing the workspace to a server for access by authorized participants. Obtaining each identified application from the application provider referred to by the application's application identifier.

Particular embodiments of the subject matter described in this specification can be implemented to realize one or more of the following advantages. Workspaces unite relevant information from documents, enterprise applications and the world wide web. A workspace will retrieve the latest version of an application since workspace definitions contain application provider information. Workspaces enable collaboration among workspace participants The details of one or more embodiments of the invention are set forth in the accompanying drawings and the description below. Other features, aspects, and advantages of the invention will become apparent from the description, the drawings, and the claims.

DESCRIPTION OF DRAWINGS

FIG. 4 is a diagram of an example shared workspace and participants.

FIG. 7B illustrates various servers that an application container can communicate with.

Like reference numbers and designations in the various drawings indicate like elements.

DETAILED DESCRIPTION

Figure 1:
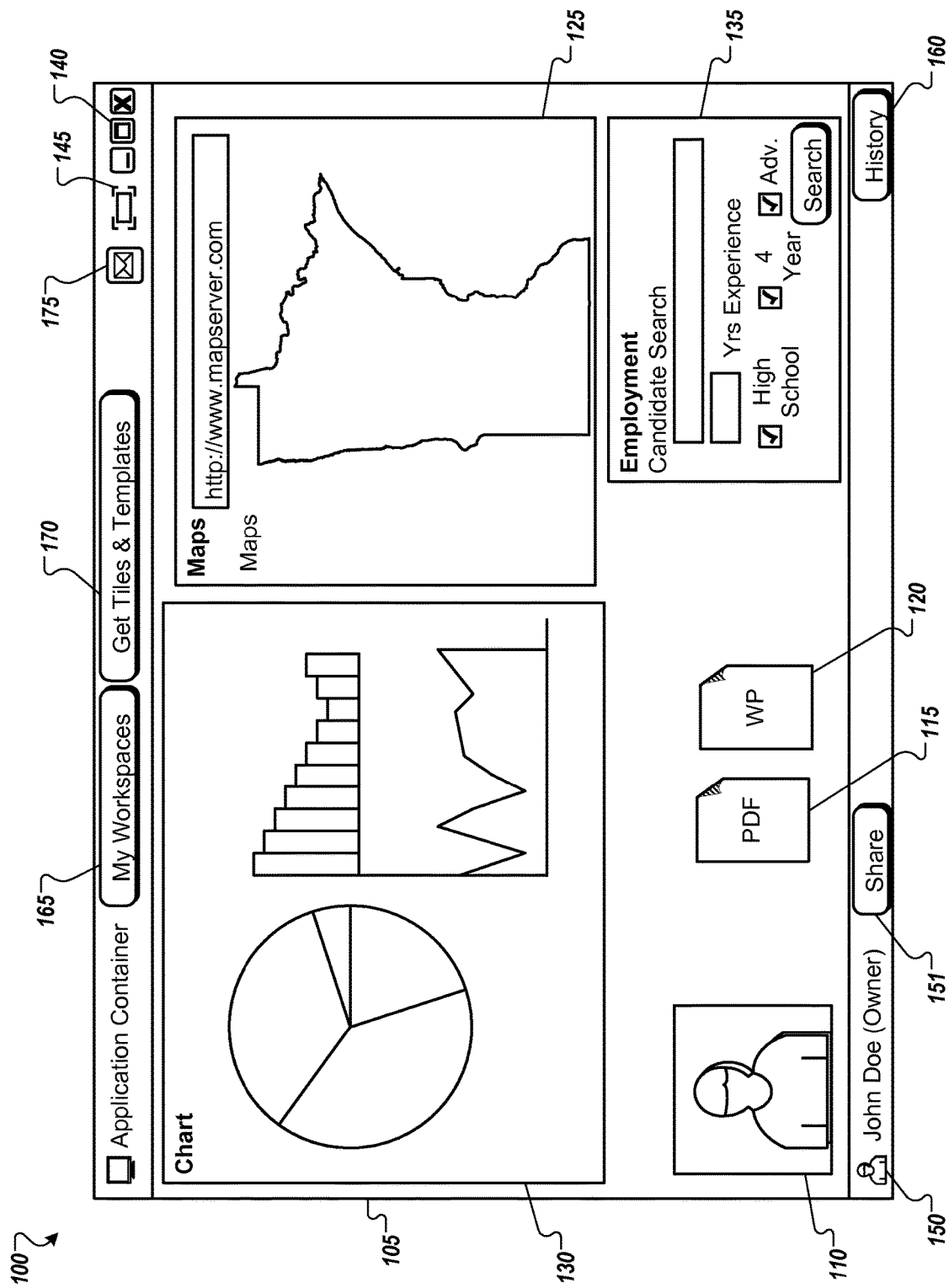
FIG. 1 illustrates an example graphical user interface for a workspace.

FIG. 1 illustrates an example graphical user interface for a workspace. Generally speaking, a workspace (e.g., 100) is a dashboard that integrates software applications and information needed to perform specific tasks with a unified graphical user interface (GUI) 105. For example, a workspace can be configured for use by stock traders to include stock tickers, business news headlines, a calculator application, and a contact organizer. In another example, a workspace can be configured for use by students to include a word processor, an electronic book (e-book) reader, reference e-books, links to class syllabi, and an instant messenger that can be used to communicate with members of the student's homework study group. The applications and documents in a workspace have a lightweight representation that is portable across different computing devices. For example, a user can access a workspace on a personal computer, then on a laptop computer, followed by a smart phone.

In various implementations the state of one or more of a workspace's applications, documents, the workspace itself, or combinations of these, is automatically saved at various times or when a user closes a workspace. This allows users to take their workspace and current context with them as they change computing devices. In some implementations, an application's state describes the application's user interface location, size and appearance of the application's user interface in the GUI 105, the context of application, or combinations of these. Other application state information is possible. For example, application state information includes an identity of the web browser application 125, a set of coordinates that initially place the application 125's user interface in the upper-right corner of the GUI 105, a uniform resource locator (URL) of web page that the application 125 is displaying, the scrolled position and magnification of the web page in the application 125's user interface, and/or other information that can be used to describe the state of the application 125. A history button 160 can be selected by users to open a history recall interface that provides the user with an ability to recall and display previous application and workspace 100 states. The history recall interface is discussed in reference to FIGS. 12A and 12B. Application state and other information that comprise a workspace definition are discussed further in reference to FIG. 6 below.

Workspace applications execute within, or their execution is coordinated by, an application container which, in some implementations, manages the GUI 105. Workspace applications expose their respective user interfaces, if any, in the GUI 105. By way of illustration, the workspace 100 includes the web browser application 125, a charting application 130, and a search engine application 135. Each application's respective user interface occupies a portion of the GUI 105. In some implementations, the GUI 105 can extend beyond the window borders of the workspace 100 so that an application's user interface may be partially visible or may not be visible in the GUI 105 until the workspace 100's view is changed to include that portion of the GUI 105 which includes the application's user interface.

In some implementations, application user interfaces can be arranged in the GUI 105 by one or more panels. A panel is a visible or invisible organization element in the GUI 105 used to spatially arrange application user interfaces. For example, a panel could specify a grid layout in the GUI 105 where the grid's cells serve as locations for applications to display their user interfaces. By way of further example, panels can be composed in logical layers so different application user interfaces are presented in the GUI 105 depending on what layer is being viewed. Other techniques for organizing application user interfaces in the GUI 105 are possible.

In some implementations, the applications 125-135, the documents 110-120, and the application container 105 can share information to perform interrelated tasks. For example, the user can type the name of a job applicant into the search engine application 135, and the search engine application 135 can search a contact database for the named applicant to retrieve the applicant's address, desired job position and company, and salary requirements, and share that information with the other applications 125-130. The web browser application 125 can use the applicant's address to display a map of the applicant's location and/or the address of the desired job position. The charting application 130 can use the address, desired position, and salary requirements information to query an employment demographics database to present a visual representation of comparative salary statistics for similar job positions in nearby geographical regions. In some implementations, the workspace 100 can use the applicant's identity to dynamically present relevant ones of the electronic documents 110-120, such as to load the applicant's picture as the image document 110, the applicant's resume as the PDF document 115, and/or a job description as the word processing document 120.

In various implementations, the GUI 105 provides various interactive controls. The user can maximize, minimize, and resize the application container 105 with a collection of window controls 140. The user can also select a full-screen button 145 to cause the application to occupy substantially the entire screen. The application container 105 also includes a collection of user identity information 150 for the current user or "participant" of the workspace 100, such as the participant's name, workspace role, picture, and/or other identifying information. Workspace roles and associated privileges are discussed further with reference to FIG. 8A below. A button 165, when selected, shows a participant their workspaces, both private and shared. A private workspace is used by only one participant, usually the person who created the workspace, but a private workspace can be shared with other workspace participants by selecting button 151 and inviting others to join. Shared workspaces are discussed further below.

A button 170, when selected, presents a catalog user interface that provides a participant with an ability to obtain additional applications or workspace templates. The catalog is discussed further in reference to FIGS. 5a and 5b. The application container 105 also includes a distribution button 175. In some implementations, the distribution button 175 can be activated to send copies of the workspace 100 to others. In some implementations, the distribution button 175 can be activated to publish the current version of the workspace to a distribution server so that other participants can obtain the updated version of the workspace.

In some implementations, a workspace can include documents in addition to applications. By way of illustration, the workspace 100 includes the following documents: an image 110, a portable document format (PDF) document 115, and a word processing document 120. Examples of other types of documents that can be included in the workspace 100 are audio files, video files, spreadsheets, presentations, Hypertext Markup Language (HTML) documents, eXtensible Markup Language (XML) documents, binary files (e.g., executables), text files, compressed files, other file types, and combinations of these.

Figure 2:
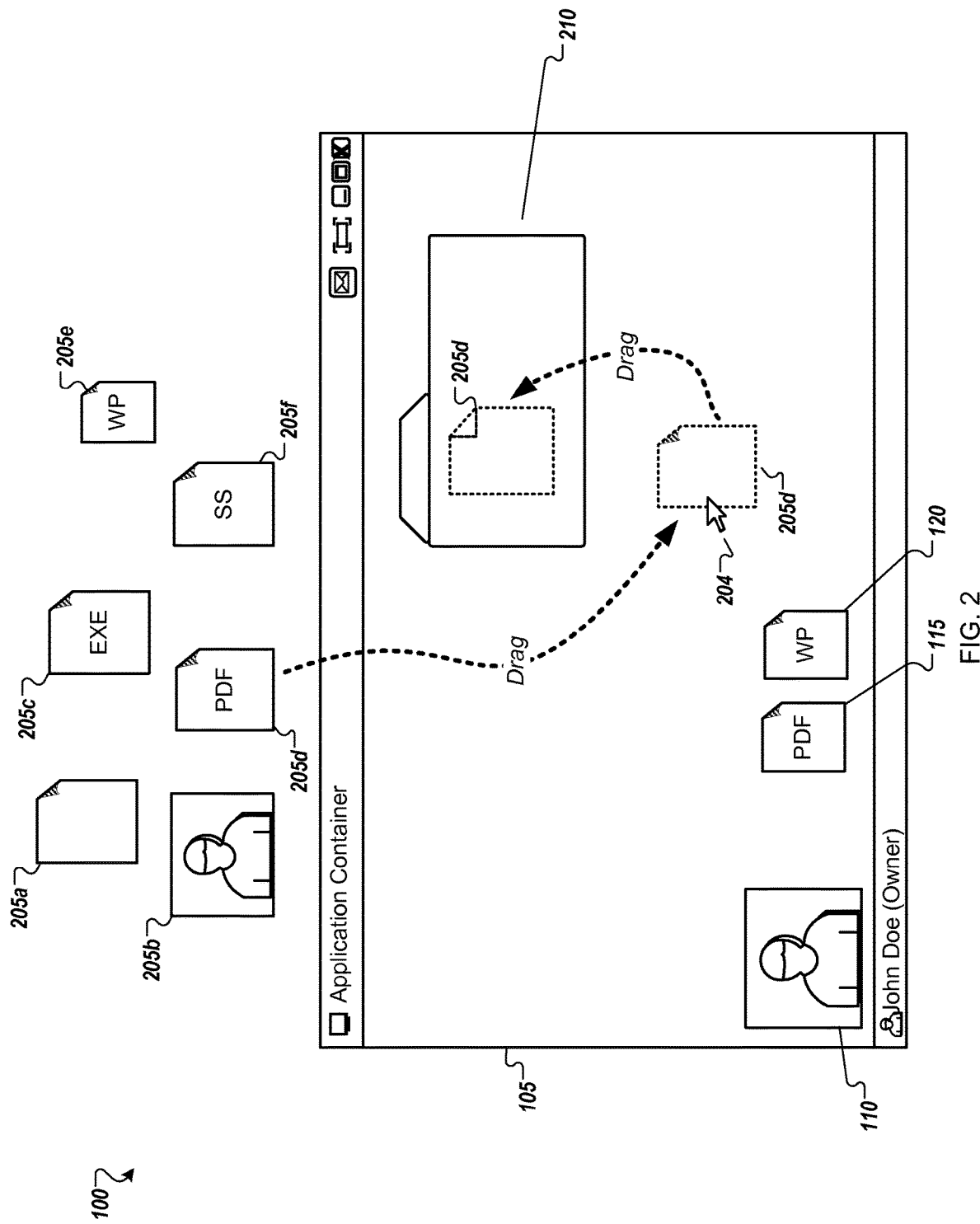
FIG. 2 illustrates an example of importing a document into a workspace.

FIG. 2 illustrates an example of importing a document into a workspace. As described previously, a workspace can include documents such as the documents 110-120 and workspace applications (e.g., 210). Documents, such as slide show document 205a, an image document 205b, a application program document 205c, a PDF document 205d, a word processing document 205e, a spreadsheet document 205f, and workspace applications, can be imported to, or exported from, the workspace 100. In some implementations, this is accomplished by a drag-and-drop operation where documents or workspace applications are dragged by a user (e.g., with a mouse or other input device) between an operating system's GUI desktop metaphor and the application container's GUI 105. Dragging a workspace application or a document from a desktop metaphor to the application container GUI 105 causes the dragged application or document to be imported into the workspace and the GUI 105 to be updated to show a visual representation of the application or document (e.g., an icon or a thumbnail image). Likewise, dragging a workspace application or a document from the GUI 105 to the desktop metaphor causes the application or document to be exported from the workspace and the GUI 105 to be updated to remove the visual representation of the application or document. Other types of input besides drag-and-drop are possible to perform these operations including, but not limited to, keyboard or other button input, gestures, finger touches, voice or sound commands, or combinations of these.

By way of illustration, the document 205d is dragged to the GUI 105 as indicated by mouse cursor 204. When a document is imported into a workspace, the workspace's definition is updated to reflect that the document 205d is now part of the workspace. In addition, the workspace state information is updated to retain the location of the visual representation of the document 205d (e.g., an icon) in the GUI 105. In some implementations, the document 205d is copied into the workspace definition or to local or remote storage that is accessible to the application container.

In various implementations, when a document is imported into a workspace, the application container associates an external application or a workspace application with the document. The associated application is invoked when a user wishes to view or edit the document. Generally speaking, a table of associations between document types and applications can guide this process. For example, if a spreadsheet document created outside of the workspace is imported into the workspace, the associated application would be the external spreadsheet application. Alternatively, if there is a workspace application that can be used to view and/or modify the document, the workspace application is associated with the document. In the former case, when a user selects the document for viewing or editing in the workspace (e.g., by performing a mouse double-click on the document's icon) the associated application is invoked with the document. If the application is external to the workspace, the document can first be copied into a file system or other storage location where the external application can access the document.

When a workspace is shared, there exists the possibility that a workspace participant may add a document to the workspace associated with an external application that is not available on each participant's computing device. To enable participants without access to the application to view such documents, such as by using a commonly available workspace application or external application document viewer, a portable version of the document 205d is created and copied into the shared workspace definition or stored on a document repository server in some implementations. In some implementations, the portable version of a document has the same fidelity of the original document. The portable version does not require the application used to create the document 205d in order for the document to be viewed in the shared workspace. For this reason, and in some implementations, the portable version of a document is not capable of being edited or modified to the extent that the original version of the document is. In some implementations, the portable version is a PDF document and is produced by causing the document 205d's creating application to export the document 205*d* as a PDF document. Other types of portable documents are possible.

In some implementations, the application for viewing portable documents allows users to annotate such documents with markups, notes and marginalia that can be saved along with the portable version of the document. A given participant's view (e.g., current scroll position and magnification) of a portable document in an application for viewing portable documents, including annotations if any, can be shared with other participants. In some implementations, a viewer application for portable documents allows participants to fetch the original version of the document from a document repository for editing, for example.

In further implementations, a preview or thumbnail image of the document 205*d* is stored in the workspace definition and the full version of the document 205*d* is stored on a document repository. When a user accesses a document through the GUI 105, if the document is not present in the workspace definition or in local storage, such as may be the case when using a shared workspace, the application container downloads the document from a document server. Document downloading is deferred until a participant attempts to view more than a document's preview or thumbnail image document.

When a workspace application is imported into a workspace, workspace's definition is updated to reflect that the workspace application is now part of the workspace. In some implementations, the workspace application is copied into local cache of workspace applications, the workspace definition is updated to indicate the storage location of the application, and the workspace application is then executed by the application container.

In some implementations, the workspace includes a file repository workspace application 210. The file repository application 210 allows users to add and remove documents and workspace applications to/from a global document repository simply by dragging the document and workspace application icons between the application 210's user interface and the GUI 105. This allows users to share information without having to share their workspace.

The document repository workspace application 210 provides users with interactive access to a document repository for the storage and distribution of shared documents. For example, documents 205*a*-205*f* can be moved among the host, the workspace 100, and the shared file repository interface 210. In some implementations, the shared file repository can be a central file server that multiple users can access through separate instances of the workspace 100 and shared file repository interface 210.

When a document or workspace application is exported or otherwise removed from a workspace, information pertaining to the workspace application or document is removed from the workspace definition and, in some implementations, any cached versions of the workspace application or document are removed.

Figure 3:
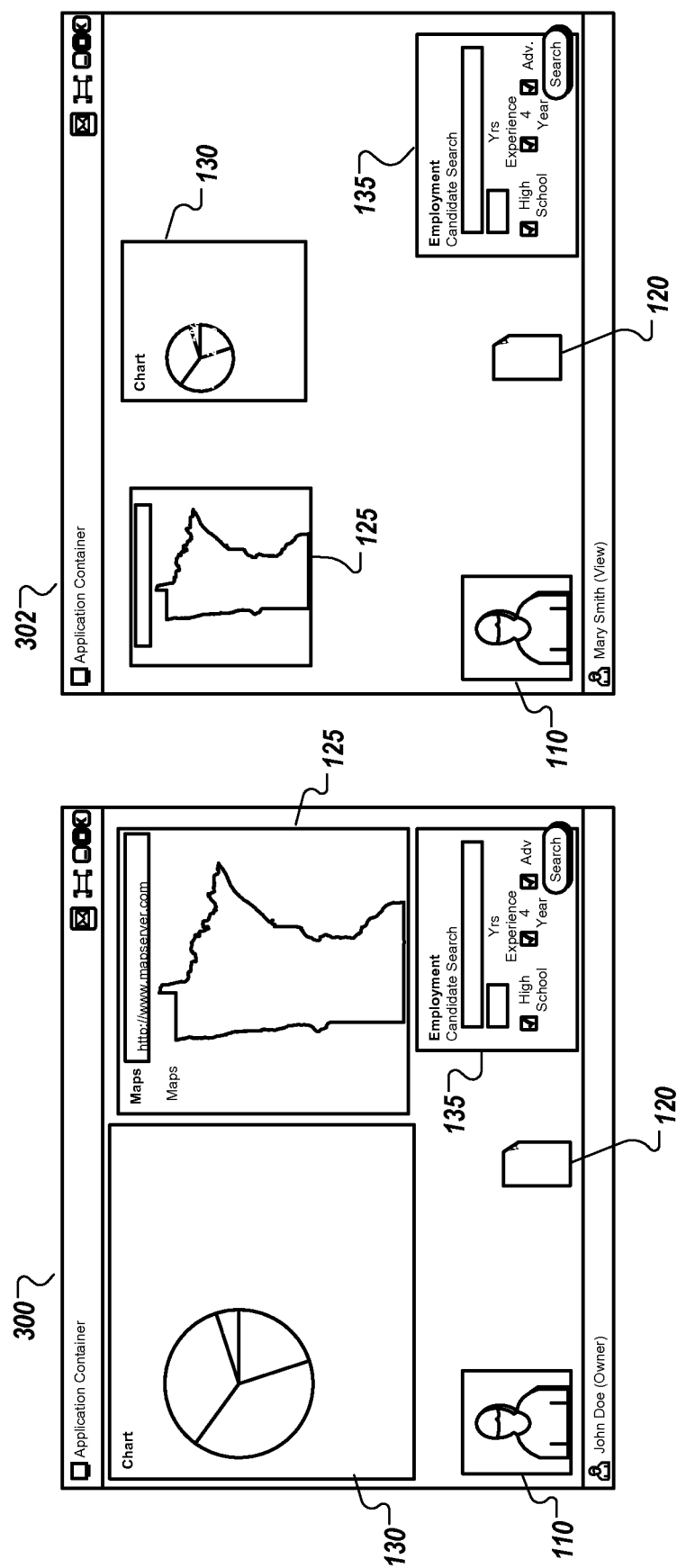
FIG. 3 illustrates a public view and a private view of an example shared workspace.

FIG. 3 illustrates a public view and a private view of an example shared workspace. As described above, a participant can chose to share a workspace with other participants. Shared workspaces have a single public view which describes a default appearance of the application container's GUI (e.g., 105), the workspace state, the state of the workspace's applications, or combinations of these. The public view is established by the shared workspace's creator or owner, for example. Each shared workspace participant can use a shared workspace through its public view. In some implementations, a shared workspace's public view is stored in a workspace definition's workspace state information.

In some implementations, participants can create their own private (i.e., custom) views of a shared workspace by changing the size and location of application user interfaces, hiding application user interfaces, and customizing workspace applications, for example. Other ways to customize a workspace view are possible. In further implementations, the extent to which a participant's private view can depart from the public view is based on one or more workspace roles associated with the participant. Roles are discussed further below. In some implementations, a shared workspace's private view is stored in a workspace definition's workspace state information.

Workspace participants can switch back and forth between the public view and their private view. By way of illustration, GUI 300 presents a public view of the shared workspace 100 which includes a charting application 130, a web browser application 125, an image document 110, word processing document 120 and a search engine application 135. GUI 302 presents a private view of shared workspace 100 in which the size and location of applications 125 and 130 has changed.

FIG. 4 is a diagram of an example shared workspace and participants. A workspace definition (e.g., 400*ac*) is received from server 418 or other process by an application container running on a computing device (e.g., 408, 410, 416) and a local copy is made on the computing device, or a storage location accessible to the computing device, for use by the application container. This allows a given participant to access and use a workspace from a number of computing devices and to work in an offline mode. In this example, the participant "Bob" is using a desktop computer 408 to utilize a workspace instantiated from workspace definition 400*a*. The participant "Susan" is using a laptop computer 410 to utilize a workspace instantiated from workspace definition 400*b*. And the participant "Jim" is using a smart phone 416 to utilize a workspace instantiated from workspace definition 400*c*.

A workspace can be used in online mode or offline mode. When a workspace is in online mode, the application container is able to synchronize changes to the local workspace definition at various times with a workspace definition maintained by a server (e.g., 418). Moreover, collaboration services and workspace applications which utilize network services will not have their functionality impaired. However, a workspace can be instantiated and used offline to the extent that network communication is not required by the workspace's applications, and assuming there is a copy of the workspace definition on the computing device or accessible to the computing device. When a workspace is in online mode, the workspace is able to synchronize changes made to the workspace definition while the workspace was in offline mode with the workspace definition maintained by a server. By way of illustration, participant Jim is using workspace definition 400*c* offline, for instance. If Jim adds workspace applications or otherwise changes the workspace definition, these changes will be propagated to the corresponding definition 400*c* on server 420 when Jim's workspace is back online.

Workspaces can be shared with others when a user creates or obtains a workspace (e.g., from a workspace template), and then "publishes" the workspace to server which, in some implementations causes a copy of the published workspace's definition to be placed on the server where it can be accessed by others. Next, the user invites others to join the workspace as participants. Initially, the user who published the workspace is the only participant. If others elect to join the shared workspace, they will receive a local copy of the shared workspace definition which, depending on roles and privileges, they may be allowed to customize to some extent.

Unlike non-shared workspaces, shared workspaces allow one or more participant's changes to their local copy of the shared workspace definition to be propagated to all copies of that workspace definition maintained by other participants. For example, assuming that Susan owns or has control over a shared workspace, she can modify the workspace definition 400b (e.g., add/remove applications, add/remove documents, etc.) and the modifications will be propagated to each participant's local copy of the workspace definition if she elects to publish the changes. (In some implementations, if Susan closes her workspace without publishing the changes she will be prompted if she wants to discard, publish or save the changes.) For example, published changes to the workspace definition 400b will be synchronized with the copy of 400b on the server and then propagated to Bob and Jim's respective local workspace definitions (400a, 400c) when they are next synchronized with the server 418. In further implementations, if an updated public view of a shared workspace is not compatible with a participant's private view (e.g., the public view no longer contains a workspace application that is in a private view), the private view can be removed from the workspace or modified to remove portions that are in conflict with the public view.

An owner or controller of a shared workspace can apply changes to the workspace definition but may not be ready to share the changes with other participants. To accommodate this, the application container has the ability to save the changes without publishing them to the server 418. If a shared workspace has more than one participant who can make changes (e.g., an owner or contributor) the workspace space is automatically locked 406 by the participant currently changing the workspace. The lock 406 excludes others from modifying the shared workspace definition. The lock is removed once the user publishes the workspace definition changes. In some implementations, a user can manually obtain the lock 406.

Figure 5A:
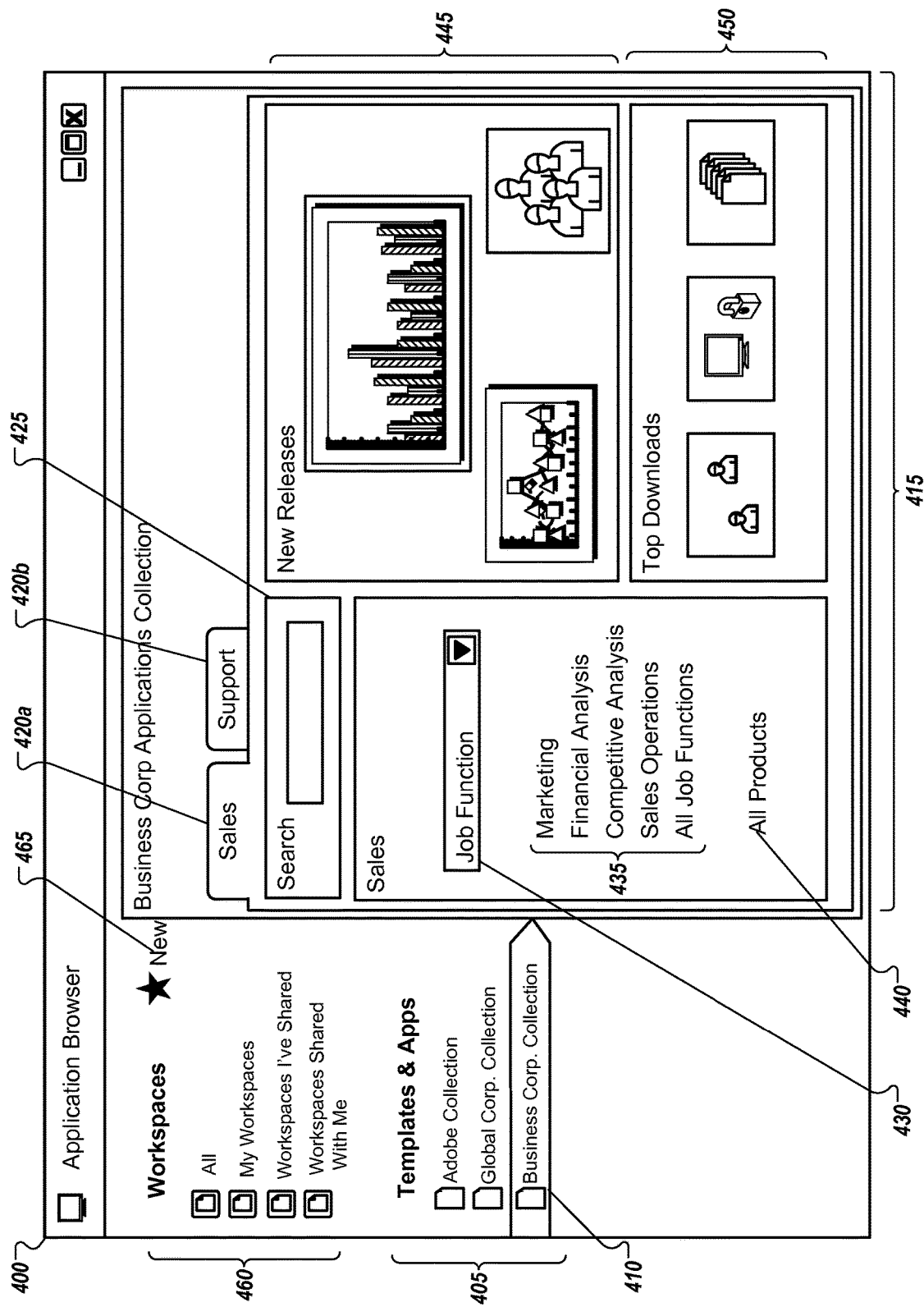
FIG. 5A illustrates an example catalog graphical user interface.

FIG. 5A illustrates an example catalog 400 GUI. In general, the catalog 400 acts as a storefront for the distribution and/or sale of workspaces, workspace templates, documents, and/or applications. (A workspace template is a workspace definition that can be modified to suit a particular user's requirements.) In some implementations, the catalog 400 provides a visual representation of the workspaces, templates, documents, and/or applications that have been made available from one or more workspace providers, document providers, and/or application providers.

For example, the "Business Corp" company can provide a collection of applications that can be obtained from a "Business Corp" application distribution server. The user can browse the collection of applications by selecting a collection control 410 to open an applications collection control 415. The applications collection 415 includes a collection of interactive tabs 420a and 420b that the user can select to move among available categories of applications. The applications collection 415 includes a search control 425 that provides the user with an ability to search for applications (e.g., by name, keyword, category). For example, the user can enter the word "weather" to browse a collection of applications that can include applications that provide weather forecasts, satellite imagery, and/or current conditions.

The applications collection control 415 includes a subcategory control 430. The subcategory control 430 can be used to browse among subcategories of available applications. In the illustrated example, the user has selected to view applications within the "Business Corp" collection (e.g., by selecting the control 410 in the template and tiles area 405) of "sales" related applications (e.g., by selecting the "sales" tab 420a). The "sales" collection can be further subdivided into subcategories that are grouped by job function, department, or other subgrouping. In the illustrated example, the user has activated the subcategory control 430 to group the available applications by job function. The catalog 400 responds to the selection by displaying a collection of job function controls 435. The user can also activate an all products control 440 to browse all the applications that have been made available by the application provider.

The applications collection control 415 also includes a new releases collection control 445 and a top downloads collection control 450. The new releases collection control 445 displays a collection of applications that the application provider has recently made available for download. The top downloads collection control 450 displays a collection of applications that have been downloaded most frequently by other users.

The catalog 400 includes a collection of controls 460 that provide the user with links to workspaces that the user created and/or workspaces that have been shared with the user. The controls 460 provide the user with links to the user's private workspaces, to workspaces that the user has made available to be shared with other users, to workspaces that have been shared with the user, and/or to a collection of all the workspaces that the user can access. A new workspace control 465 is included to provide the user with the option to create a new, substantially empty workspace. An example process for creating a new workspace is discussed in the description of FIG. 11.

Figure 5B:
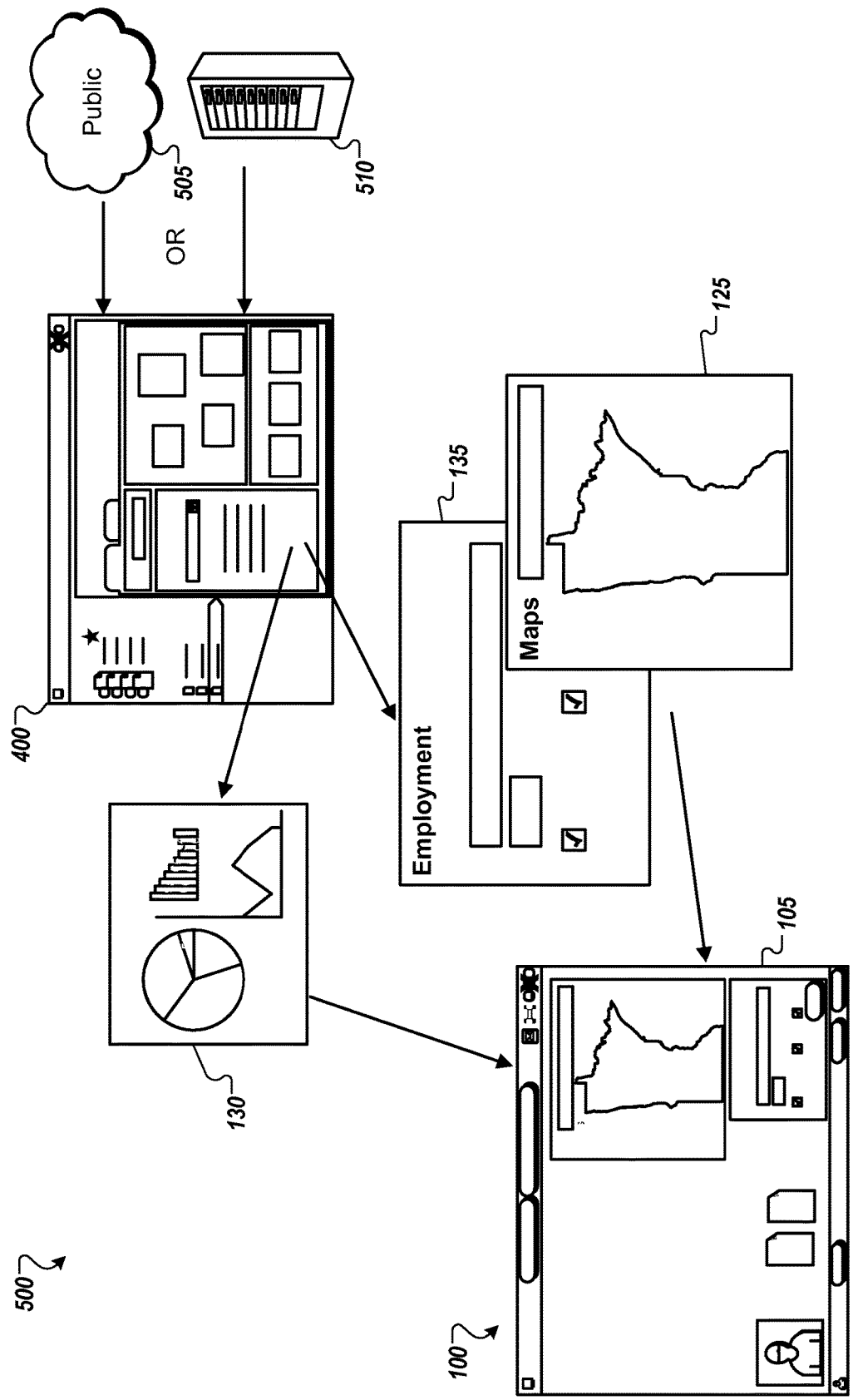
FIG. 5B shows an example interaction for obtaining applications and documents through the catalog.

FIG. 5B shows an example interaction 500 for obtaining applications and documents through the catalog 400. In general, the user can browse the catalog 400 to select applications, such as the applications 125-135, for inclusion in the workspace 100. The catalog 400 receives a collection of application data from a public server 505 and/or an enterprise server 510. The public server 505 can publicly distribute applications from one or more application providers. In some implementations, the public server 505 can be a commercial server. For example, the public server 505 can distribute applications with the intent of selling users licenses to use the available applications.

In some implementations, the enterprise server 510 can distribute applications privately. For example, the enterprise server 510 can be an intranet server that distributes applications only within an organization's network. Users within the organization's network can browse the organization's privately distributed applications through the catalog 400, whereas users outside of the organization's network cannot. In some implementations, the enterprise server 510 can distribute applications publicly. For example, the organization can be in the business of creating commercial applications, such as the applications 125-135, and the enterprise server 510 can make the organization's commercial applications available through the catalog 400.

Through the catalog 400, the user can select one or more of the applications 125-135 for inclusion in the workspace 100. In some implementations, the applications 125-135 can be added to the workspace 100 in one or more drag and drop operations. For example, the applications 125 can be selected in the catalog 400 and dragged to a position within the workspace 100. In some implementations, applications can be added to the workspace 100 by selecting the applications 125-135 within the catalog 400. For example, the user can add the applications 125-135 to a list, and when the list is complete the user can activate a control that closes the catalog 400 and populates the workspace 100 with the applications' 125-135 data.

Figure 6:
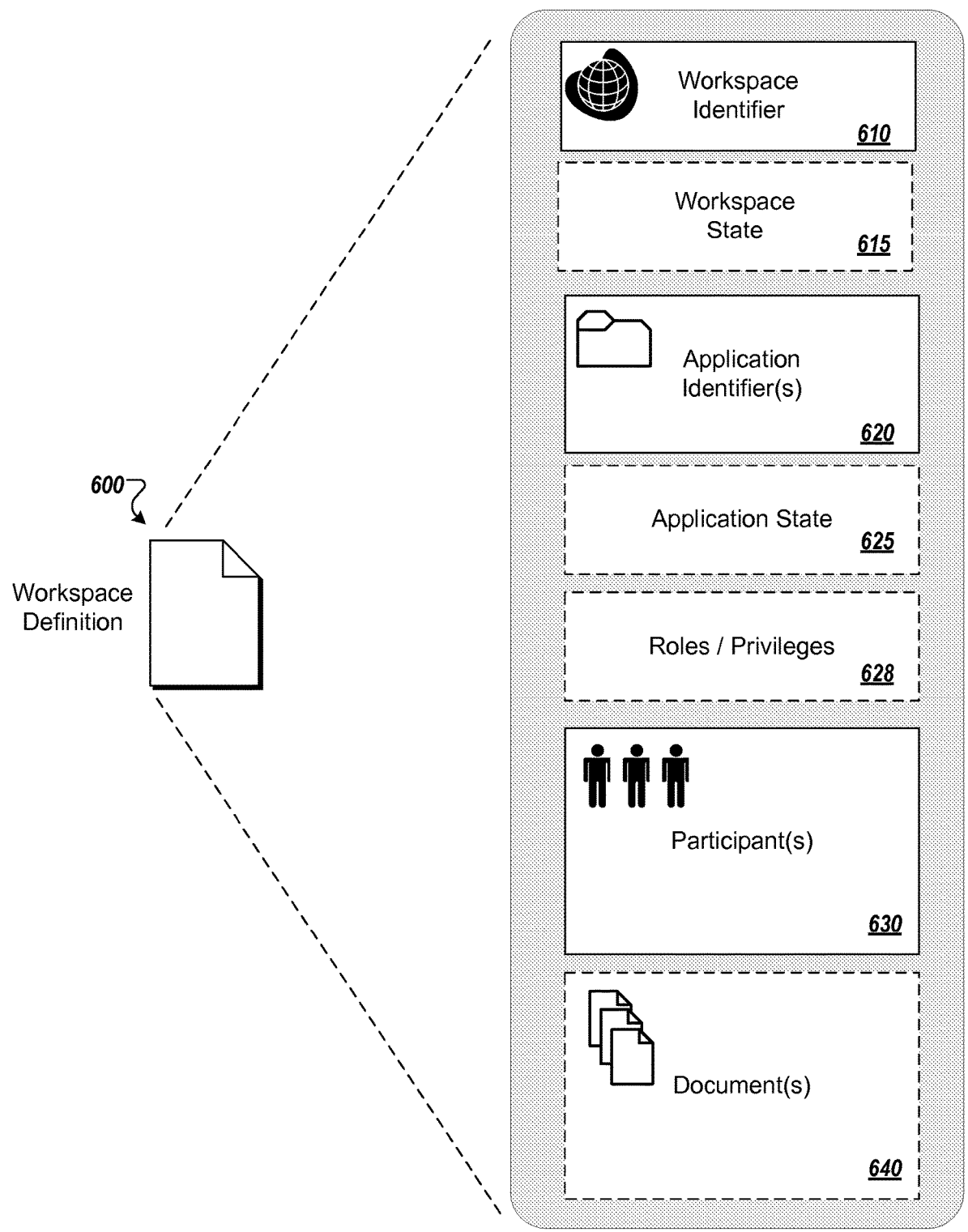
FIG. 6 illustrates a block diagram of an example workspace definition.

FIG. 6 illustrates a block diagram of an example workspace definition 600. In general, the workspace definition 600 is a collection of data that describes the content, state, and appearance of a workspace, such as the workspace 100 of FIG. 1. Workspace definitions are processed by application containers to instantiate workspaces. A workspace definition may be stored in a portion of a file that holds other data, in a single file dedicated to the workspace definition, or in multiple coordinated files on a single computing device or distributed among multiple computing devices connected by one or more networks. In some implementations, a workspace definition can be stored in a memory without first having been stored in a file. Workspace definitions do not need to be stored locally on the same computing device as the application container which processes them. In some implementations, workspace definitions are stored as information in one or more tables in a relational database. In further implementations, the workspace 100 can be stored as an extensible markup language (XML) document or other markup language document.

In various implementations, the workspace definition 600 includes a workspace identifier 610, one or more application identifiers 620, and one or more workspace participants 630. The workspace identifier 610 can be used to uniquely identify a workspace 600. In various implementations, a workspace identifier is data representing a sequence of one or more letters, numbers, symbols, codes, special characters or combinations of these. In further implementations, the workspace identifier 610 is a data structure. By way of illustration, the workspace identifier 610 can be a file name, a URL, a record number in a database, or other identifiers that can be used to identify the workspace 100. In some implementations, the workspace identifier 610 is unique within a namespace. For example, the workspace identifier 610 can be a unique filename within a collection of electronic files included in the folders of a file repository that define a namespace, such as "\\server\folder\subfolder\workspacefile". In another example, the workspace identifier 610 can be a unique server and file address, such as "http://www.company.com/intranet/department/jobfunction/workspace.xml". Other workspace identifiers are possible.

The one or more application identifiers 620 identify one or more applications (e.g., the applications 125-135) in the workspace 100. In various implementations, an application identifier is data representing a sequence of one or more letters, numbers, symbols, codes, special characters or combinations of these. In further implementations, an application identifier 620 is a data structure. In some implementations, an application identifier is unique within a namespace. In yet further implementations, an application identifier can be used to identify an application and an application provider from which the application can be obtained. For example, the application identifier can be a file path, wherein the application is uniquely identified by an application provider, a department, a class, and a file name, such as "\\AcmeIncorporated\customerservice\warrany\spareparts.swf." In another example, the application can be an URL that references an application provider and an application, such as "http://www.realestate.com/applications/propertysearch.swf" where "http://www.realestate.com/applications/" is the application provider and "propertysearch.swf" is the application. Other application identifiers are possible.

The one or more participants 630 each identify a workspace participant that corresponds to a user, a software process, a group of users, or combinations of these. In some implementations, a workspace participant can create workspaces and, optionally, elect to share one or more of the workspaces with other participants. In further implementations, a participant is associated with participant information that is stored in the workspace definition 600, in a local cache or storage on the computing device upon which the workspace definition 600 resides, or on a different computing device such as a server, for instance. In some implementations, participant information can include, but is not limited to, some or all of the information listed in TABLE 1.

TABLE 1

| PARTICI-PANT INFORMATION | DESCRIPTION |
| --- | --- |
| Name | The real or fabricated name of a participant. |
| Description | A general description of the participant. |
| Profession | Occupation of the participant. |
| Company | The name of the company employing the participant. |
| Department | The department in the company that the participant works for. |
| Expertise tags | Textual tags (e.g., keywords, phrases) indicative of the participant's area(s) of expertise. Can be useful in searching workspaces. |
| General tags | Textual tags indicative of anything. Can be useful in searching workspaces. |
| Role(s) | One or more workspace roles that the participant can assume. |
| Contacts | Other participants that this participant has a relationship with such as, for example, an employment relationship, a project relationship, or friendship. |
| Email account(s) | Login identifier, password, and server names for each email account associated with the participant. |
| Instant messenger account(s) | Login identifier, password, and server names for each instant messenger account associated with the participant. |
| Home or business address | The participant's home or business mailing address. |
| Telephone number(s) | One or more telephone numbers and associated types (e.g., mobile phone, work phone, home phone) for the participant. |

In further implementations, the workspace definition includes one or more of the following: workspace state 615, application state 625, roles/permissions 628 and one or more documents 640. The workspace state 615 describes the state of the workspace 600 at one or more points in time or a time period. In some implementations, the workspace state 615 can include, but is not limited to, some or all of the information listed in TABLE 2. Other workspace state information is possible.

TABLE 2

| WORKSPACE STATE INFORMATION | DESCRIPTION |
| --- | --- |
| Name | The name or identifier for the workspace. |
| Application container dimensions and location | The size and position of the application container's GUI in a host operating system's GUI. |
| Workspace preferences | User workspace preferences. |
| Appearance | The location of document visual representations (e.g., icons) in the application container's GUI. |
| Creation date | The date the workspace was created. |
| Update date | The date of the most recent workspace update. |

TABLE 2-continued

| WORKSPACE STATE INFORMATION | DESCRIPTION |
| --- | --- |
| View date | The date of the most recent time the workspace was viewed. |
| Creator | The identity of the workspace's creator. |
| Owner(s) | The identities of the workspace owner(s). |
| Contributor(s) | The identities of the workspace contributor(s). |
| Observer(s) | The identities of the workspace observer(s). |
| Tags | Workspace tags. |
| Rating | Participants' rating of the workspace. |
| Description | A description of the workspace. |
| Version | The workspace version. |
| Comments for version changes | Optional comments that can accompany a new workspace version. |
| Public view | A shared workspace's public view. |
| Private view | A participants' private view of a shared workspace. |

In various implementations, the application state 625 describes the state of one or more applications (referred to by an application identifiers 620) in the workspace. In some implementations, the application state 625 can include for each workspace application, but is not limited to, some or all of the information listed in TABLE 3. Other application state information is possible.

TABLE 3

| APPLICATION STATE INFORMATION | DESCRIPTION |
| --- | --- |
| Name | The name of a participant. |
| Description | A description of the application. |
| Type | The type of application. |
| Properties | The date the application was created, its version, the identity of the application's creator, initial size, minimum size, maximum size, and company name. |
| Tags | Tags (e.g., keywords) associated with the application. |
| Rating | User ratings of the application. |
| Appearance | The location, size and appearance of the application's GUI. |
| Application context | Application-specific state information. |

In various implementations, the one or more roles/privileges 628 are job functions assigned to a workspace participant that sets forth privileges the participant has with respect to the workspace. Roles and associated privileges can reside on a computing device instead of in the workspace definition 600. A participant can be associated with more than one role. Roles and privileges are discussed further in reference to FIG. 8B.

In various implementations, the one or more documents 640 includes one or more of the following for each document in the workspace: a document preview or thumbnail, the document, a portable version of the document, the identity of a server, file system, or other resource from which the document (or portable version) can be obtained (e.g., by the application container). Documents can be stored in their original form, compressed or encrypted.

Figure 7A:
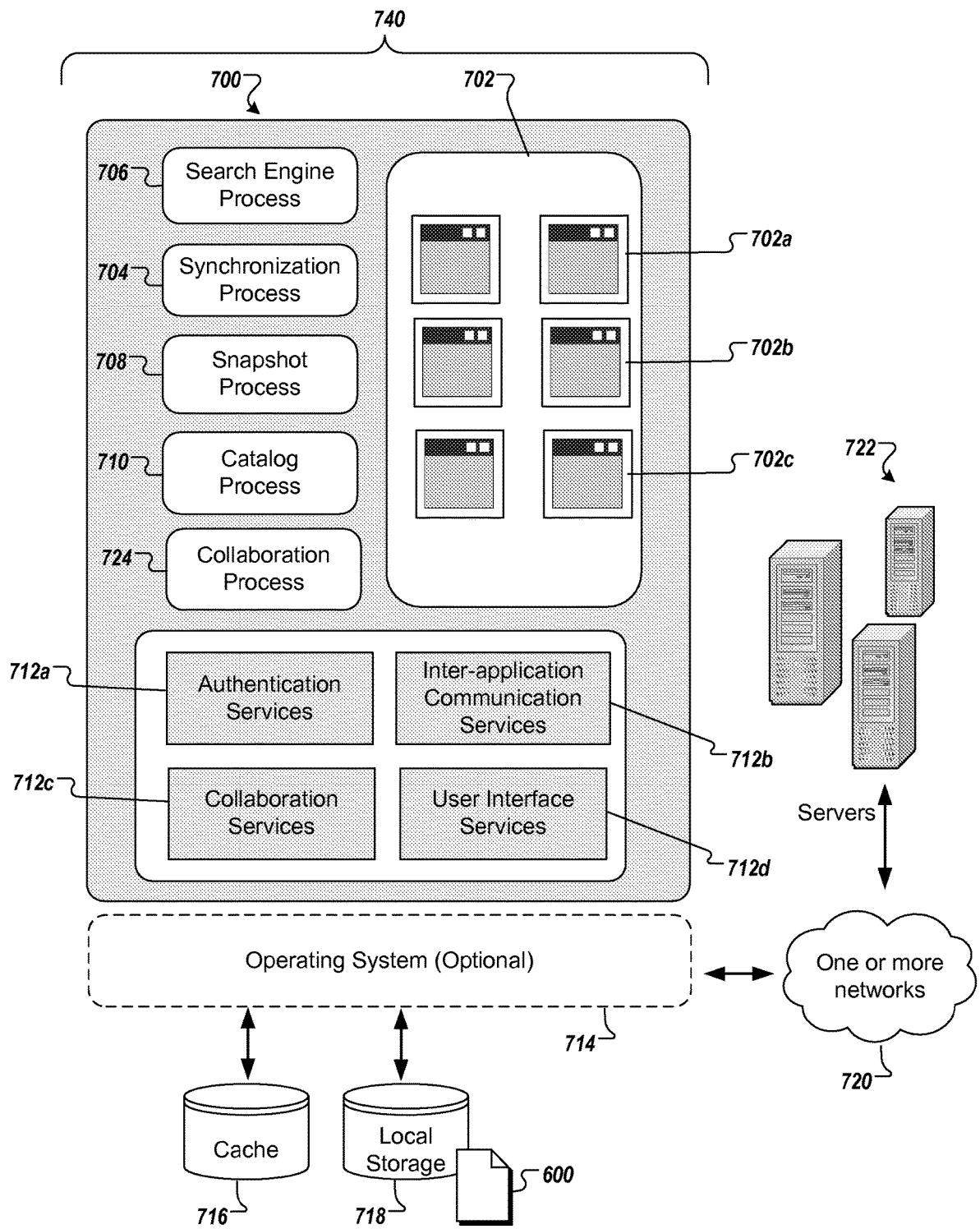
FIG. 7A is an illustration of an example client system including an application container for instantiating a workspace definition.

FIG. 7A is an illustration of an example client system 740 including an application container 700 for instantiating a workspace definition. In some implementations, the application container is based on the Adobe AIR runtime, available from Adobe Inc. of San Jose, Calif. In further implementations, the client system 740 includes an operating system 714 such as Apple Mac OS X from Apple Inc. or Microsoft Windows from Microsoft Corporation, for example, upon which the application container 700 executes. Alternatively, the client system 740 does not include an operating system; instead the application container 700 includes the necessary drivers to interact with devices on the client system 740. In some implementations, the client system 740 provides a local file system 718 which is used by the application container 700 to access applications and documents that a user of the client system 740 desires to import to, or export from, the instantiated workspace. Moreover, the file system 718 can store the application container executable program.

The client system 740 also provides persistent or non-persistent data storage in the form of memory or other computer readable media or devices which can used by the application container 700 to create a local cache 716 of downloaded applications, documents and other information. In some implementations, the local cache 716 is used to store a so-called local catalog that includes applications that a user has downloaded into workspaces instantiated by the application container 700. Optionally, the local catalog indicates which tiles are currently used in a workspace. Applications can be imported to, or exported from, the local catalog to the file system 718.

Figure 7B:
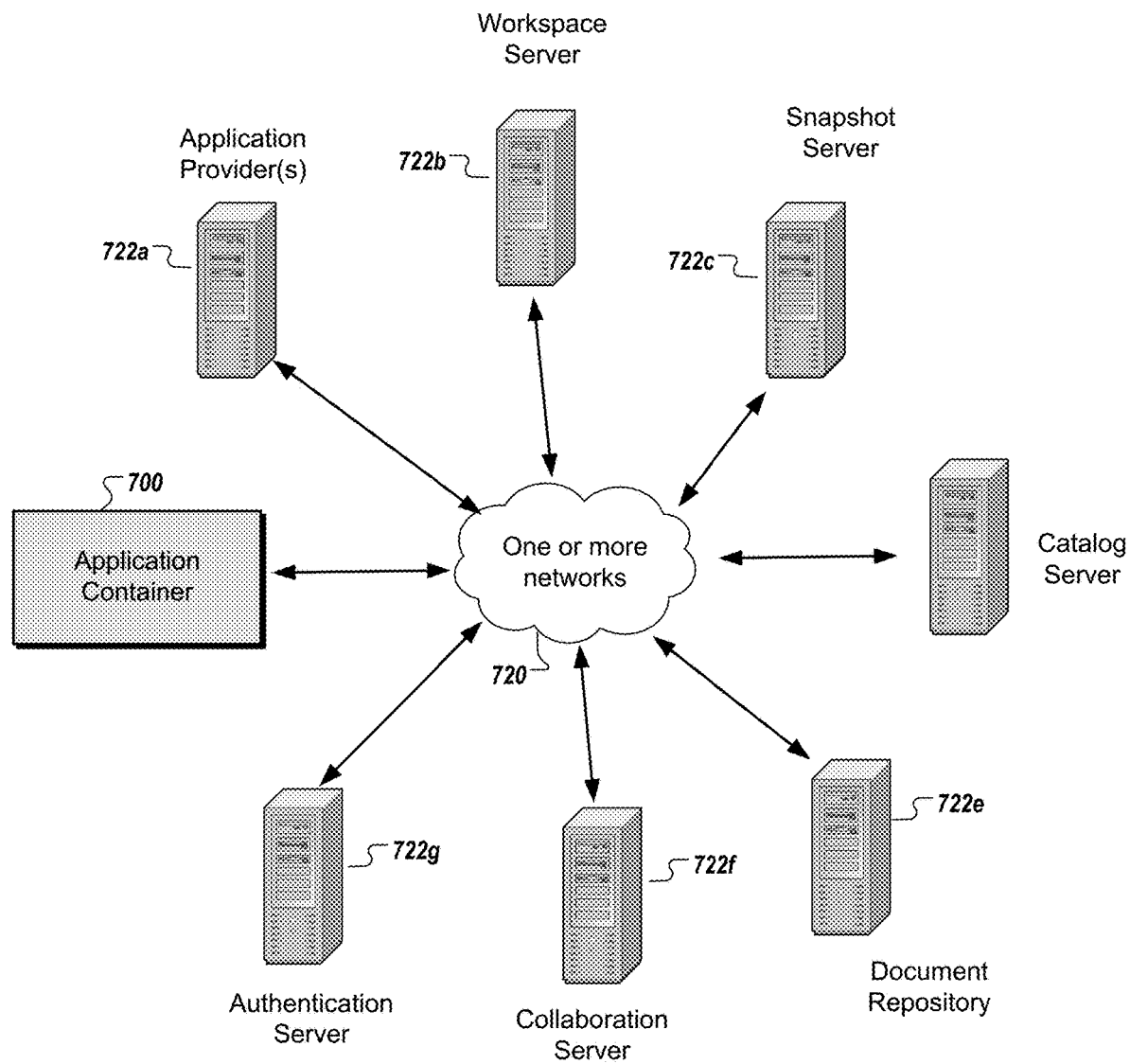

The application container 700 receives a workspace definition 600 from local storage (e.g., 716 or 718), from a server 722b (see FIG. 7B) by way of the one or more networks 720, or from a process executing on the client system 740. Application identifier(s) 620 are then read from the workspace definition 600. Each application identifier 620 refers to an application provider server 722a (see FIG. 7B) from which the application container 700 obtains a corresponding application (e.g., 702a, 702b and 702c). For example, the applications can be transferred to the application container 700 by using a data communication protocol such as HTTP, FTP or TCP/IP, for example. In some implementations, the applications are loaded into the execution environment 702 where they execute. Alternatively, the application container 700 causes the applications to execute as processes or threads in the operating system 714.

In various implementations, the execution environment 702 includes one or more virtual machines (e.g., Java Virtual Machine, ActionScript Virtual Machine, Common Language Runtime). Applications can be written in applications coded in ActionScript, ECMAScript, JavaScript or the Java programming languages, for example, and are executed by a virtual machine. Other virtual machines and programming languages are possible. Moreover, applications can access services using Internet or other data communication protocols. In further implementations, the execution environment 702 manages the executing of workspace applications executing as processes or threads in the operating system 714. The workspace applications can execute in a parallel fashion (e.g., assuming the availability of multiple microprocessor execution cores), a preemptive multitasking fashion, a cooperative fashion, or in other multitasking scenarios.

The workspace applications (e.g., 702a-c) can take advantage of services which, in some implementations, are available as software libraries whose functions or methods can be invoked by the workspace applications. Authentication services 712a allow workspace applications to perform authentication and authorization operations for workspace participants. Inter-application communication services 712b allow workspace applications to find each other and exchange information with each other during execution. Collaboration services 712c enable workspace applications to become aware of participants using a shared workspace and to communicate with the participants (e.g., through instant messaging, email, etc.). User interface services 712*d* provide services for workspace applications to create and expose their user interfaces in the application container user interface.

The application container 700 also includes support processes. A synchronization process 704 provides workspace definition synchronization services to the application container 700 by communicating with a workspace server 722*b* to obtain and synchronize workspace definitions, by communicating with a document repository 722*e* to obtain and synchronize workspace documents, by communicating with an authentication server 722*g* to authenticate the workspace participant, and by communicating with one or more application providers 722*a* to obtain workspace applications called for in workspace definitions. By way of illustration, when a participant logs into a workspace, the synchronization process 704 will request login information (unless the participant has the login stored locally) and verify the credentials with the authentication server 722*g* if the workspace is in online mode, or use locally cached credentials if the workspace is offline. Next the synchronization process 704 obtains a default or selected workspace definition from the workspace server 722*b* and, once received, obtains any needed applications from the application providers 722*a* and documents from the document repository 722*e*. The applications are then executed by the application container.

A catalog process 710 is responsible for assembling a catalog and presenting it in the GUI 105. A search engine process 706 can be used by the application container 105 or workplace applications to search the workspace definition for desired information.

A collaboration process 724 provides presence information regarding participants who are online. The collaboration process 724 can query the collaboration server 722*f* to determine which participants are logged into which non-shared and shared workspaces. Application containers and, optionally, workspace applications, can register the presence information of participants with the collaboration server 722*f* and notify the server 722*f* when participants login and logout of a workspace. Workspace applications and the application container GUI 105 can surface presence information to allow participants to collaborate with each other using instant messaging, electronic mail, voice-over-IP, or video conferencing, for example. Moreover, presence information allows users to invite each other to be participants in shared workspaces.

A snapshot process 708 captures the state of one or more of a workspace's applications, documents, the workspace itself, or combinations of these, automatically at various times and sends the information to a snapshot server 722*c* for archiving. Snapshots can be used to return an application or a workspace to a previous state. A graphical user interface is provided in some implementations for moving an application or a workspace through states as discussed in reference to FIG. 12.

Although the client system 740 was described in terms of logical service and process software components, there may be fewer or more components. Moreover, components can be combined or divided and distributed over two or more computing devices.

Figure 7C:
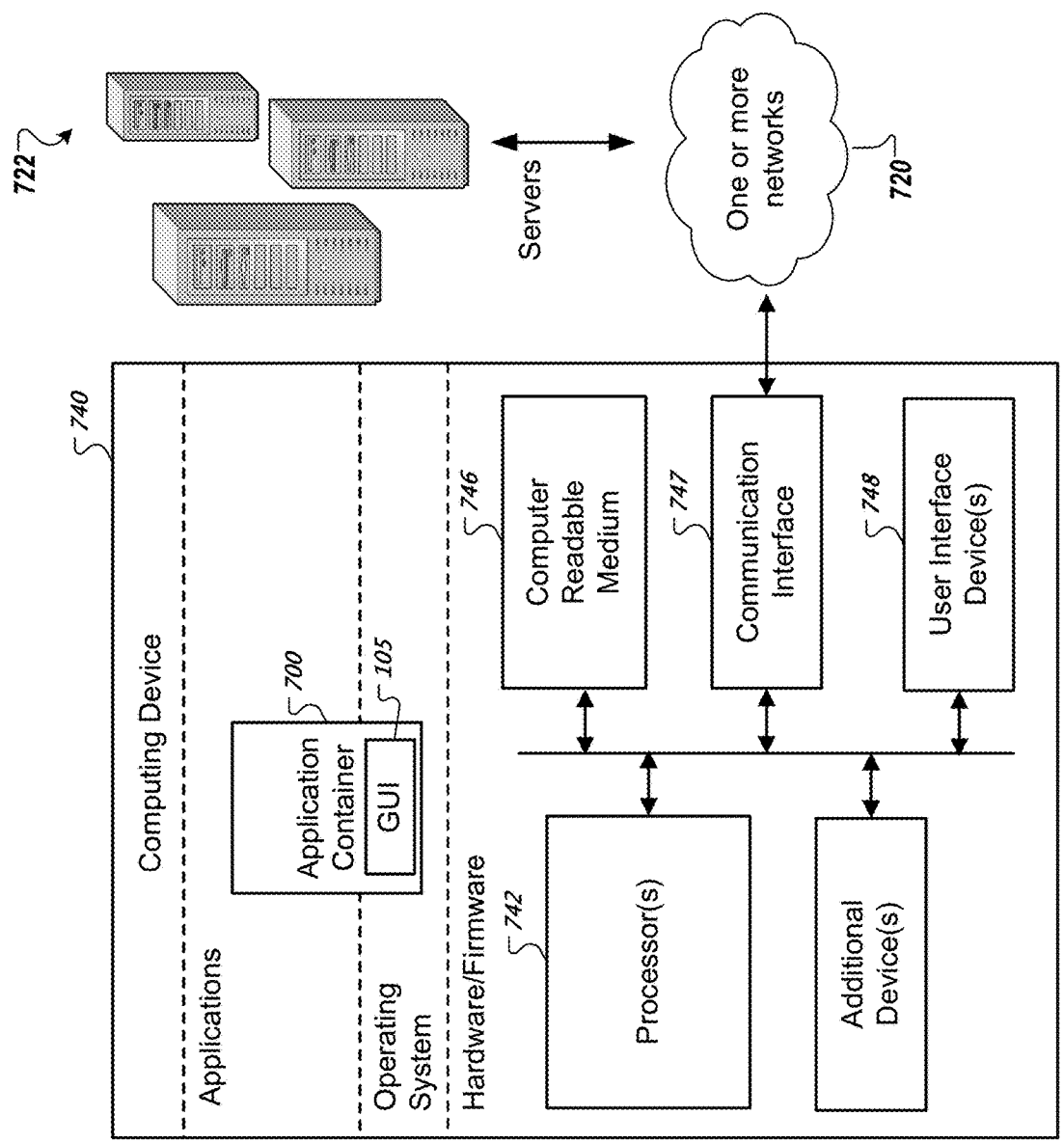
FIG. 7C is a block diagram of an example client system.

FIG. 7C is a block diagram of an example client system 740. The system 740 includes hardware/firmware, an operating system and one or more applications including the application container 700 which has a GUI 105. In some implementations, the application container 700 can be built partially or entirely into the operating system of a computing device. Machine-level or higher-level instructions for the application container 700 are stored in the computer readable medium 746 (e.g., memory, disk drives, solid state drives) and are executed by processors 742. The application container 700 can communicate with servers 722 using the communication interface 747 or other interface. For example, the communication interface 747 can implement a wireless communication protocol (e.g., Wi-Fi, Bluetooth) or a wired communication protocol (e.g., Ethernet). User interface devices 748 such as output devices (displays and speakers), input devices (e.g., mouse and keyboard), and other devices are accessed by the application container 700 through calls to an application programming interface (API) supplied by the operating system, for example.

Figure 7D:
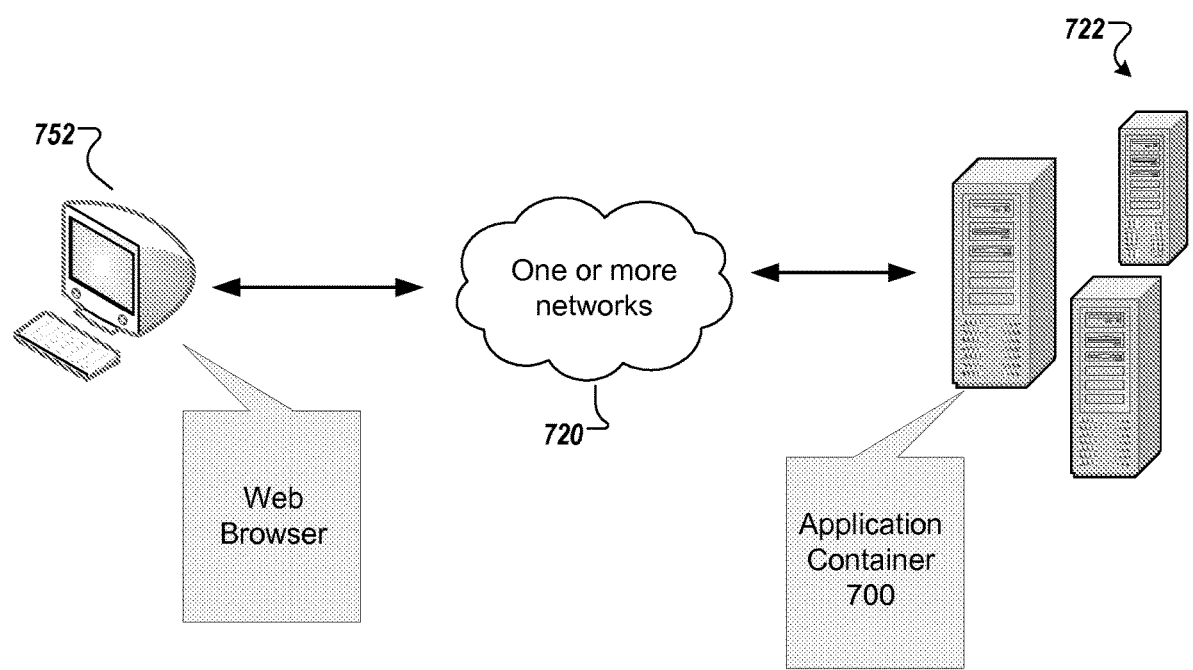
FIG. 7D illustrates a hosted application container.

FIG. 7D illustrates a hosted application container 700. This is an alternate implementation in which the application container runs on a web server rather than on a user's computing device 752. The user accesses the application container using a web browser or similar application.

Figure 8A:
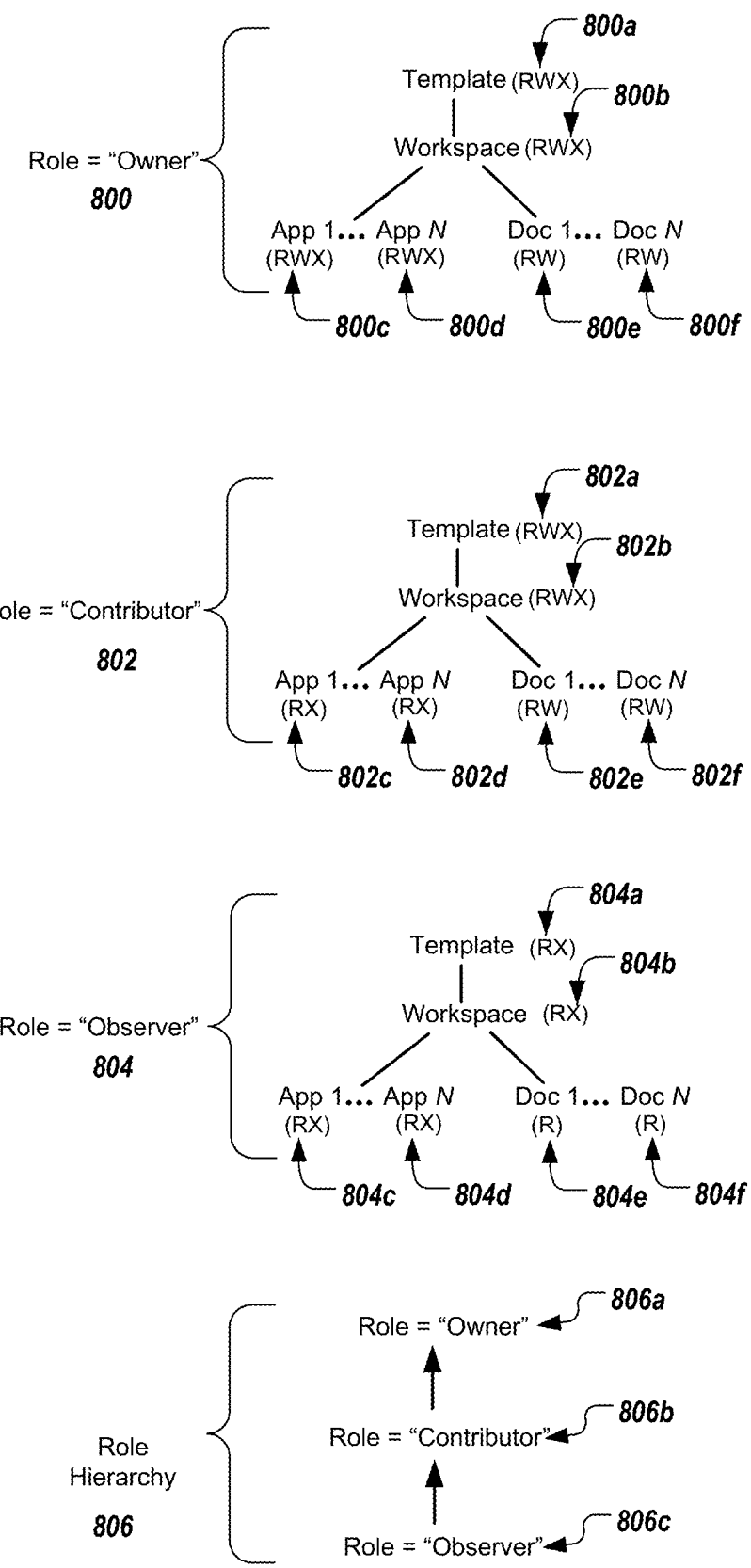
FIG. 8A illustrates example workspace participant roles and privileges.

FIG. 8A illustrates example workspace participant roles and privileges. Within an organization, roles are created for various job functions or positions. The privileges to perform certain operations are assigned to specific roles. A role is assigned to a workspace participant as a result of the participant electing to join a shared workspace, or by an administrator, for instance. In some implementations, roles are determined for workspace participants and enforced at runtime by the authentication server 722*g*. During a user's interaction with a workspace, the application container can query the authentication server 722*g* to determine a participant's role(s) and associated privileges. Alternatively, a participant's role(s) and associated privileges can be determined by the synchronization process 704 in concert with the authentication server 722*g* at various times or when a user initially logs into a workspace.

In various implementations, there are three basic roles however other roles are possible. A participant in the "Observer" role 804 can open and interact with the workspace, but is not allowed to change the public view of the workspace or share the workspace with additional participants. Observers are also not allowed to modify, remove or add documents or applications to the workspace. A participant in the "Contributor" role 802 can add, modify or delete documents in the workspace. A contributor can also change the public view of the workspace. Contributors are not allowed to add or remove applications or to share the workspace with additional participants. A contributor cannot change privileges. An "Owner" has full privileges and can add, modify and delete applications, documents and workspaces, and bestow on workspace participants roles. Owners can share a workspace with additional participants and assign privileges to roles or to participants. In some implementations, each workspace has at least one owner which by default is the user who created the workspace.

In various implementations, a role is defined as a hierarchy tree that has been decorated with privileges. For example, the role "Owner" 800 is associated with a hierarchy tree representing a specific workspace template or a generic workspace template where each node has been assigned one or more privileges, although not all nodes not have to be assigned privileges. By way of example, the root node representing a workspace template is decorated with read (r), write (w), and execute (x) privileges 800*a*. The read privilege allows the workspace participant in the role to have read-only access to data associated with the workspace template. The write privilege gives the workspace participant in the role to the ability modify data associated with the template. Finally, the execute privilege allows the workspace participant in the role to perform template operations requiring the execute privilege. Other privileges are possible. Individual documents and applications in a workspace can also be assigned privileges for a given role, as illustrated by 800b. The Contributor role 802, Contributor privileges 802a, Observer role 804, and Observer privileges 804a-f are similarly defined.

In some implementations, roles themselves can be composed in hierarchies whereby privileges associated with descendent roles are inherited by ancestor roles. By way of illustration, a role hierarchy 806 illustrates that the Contributor role 806b inherits privileges of the Observer role 806c. Likewise, the root Owner node 806a inherits the privileges of the Contributor role 806b and the Observer role 806c.

Figure 8B:
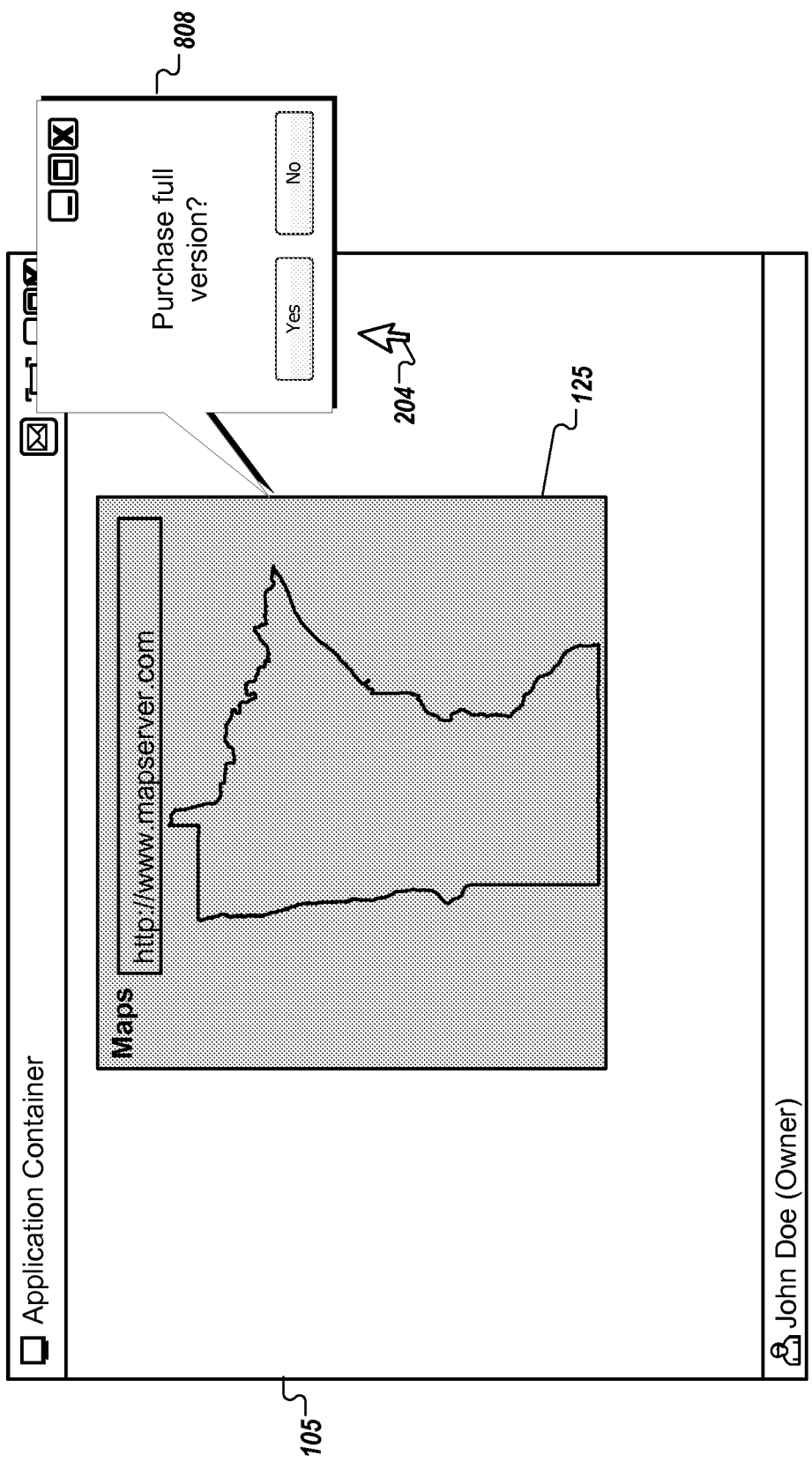
FIG. 8B illustrates an example application authorization window.

FIG. 8B illustrates an example application authorization window for a workspace application 125. As discussed previously, workspace applications can be imported into shared or non-shared workspaces. A workspace application can utilize the authentication services 712a in the application container 700 in order to determine what functionality in the application the participant is authorized to use. The workspace application can then enable or disable its functionality accordingly. For example, the map workspace application 125 has determined the current workspace participant is not authorized to use the lookup feature and has "grayed out" the map to indicate such. In further implementations, workspace applications can offer to turn on the disabled functionality or otherwise allow the user to upgrade the features by presenting an authorization window (e.g., 808) which allows the user to purchase the additional features.

Figure 9:
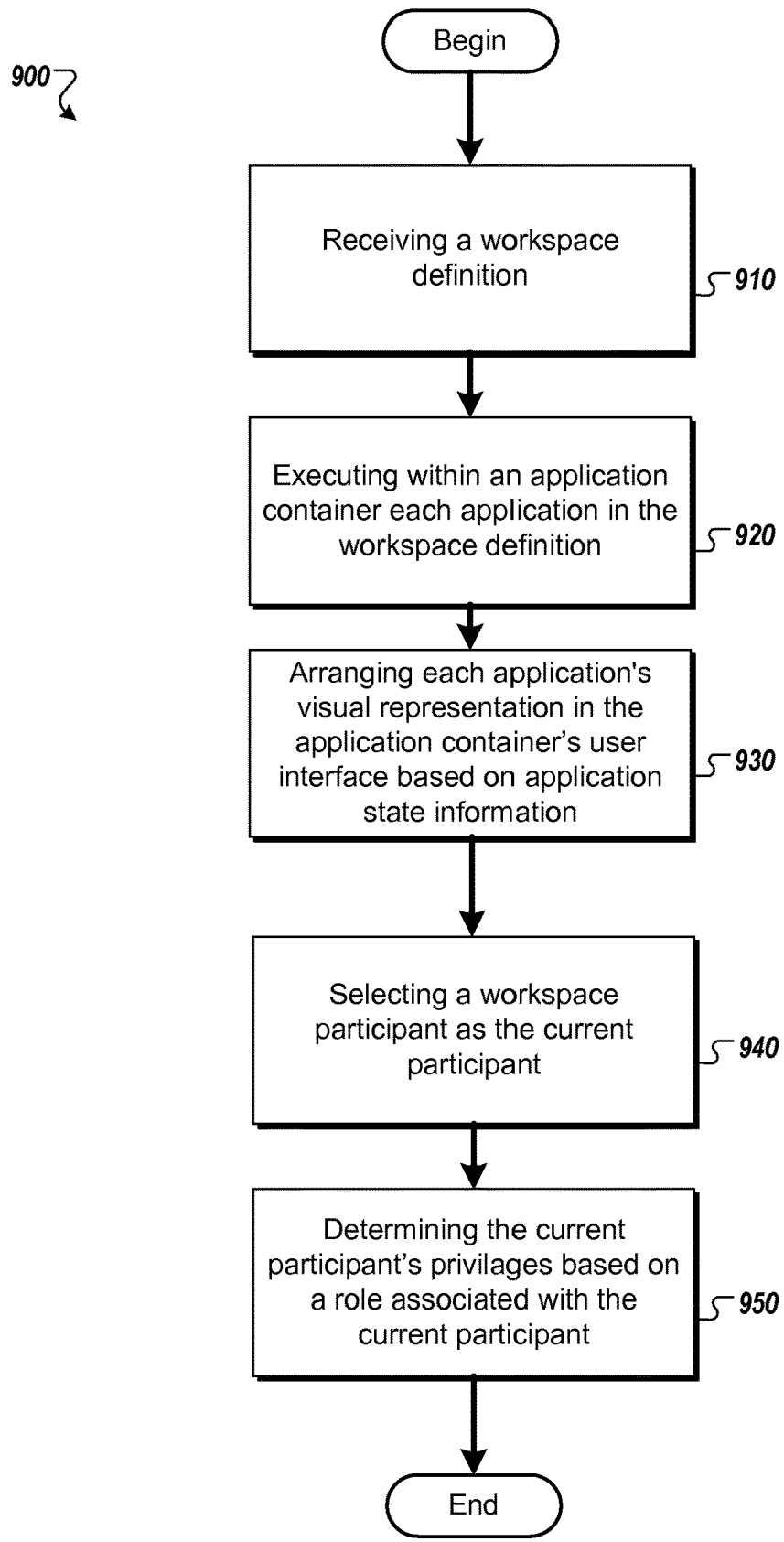
FIG. 9 is a flow chart of an example process for instantiating a workspace in an application container.

FIG. 9 is a flow chart of an example process 900 for presenting the workspace 100 in the application container 105. The process 900 begins when a workspace definition (e.g., the workspace definition 600) is received 910 by the application container 105. The application container 105 executes 920 each application (e.g., the applications 125-135) in the workspace definition. Each application's visual representation is arranged 930 in the application container's 105 user interface based on application state information. For example, the workspace definition 600 can include state information that describes the size and position of one or more applications within the workspace 100, and use that state information to size and place the applications within the workspace 100.

A workspace participant is selected 940 as the current participant. In some implementations, the workspace participant can be selected 940 to be the user that is currently logged on to the application container's 105 host. In some implementations, the application container 105 can prompt the user for identification information that can be used to select 940 the workspace participant. In some implementations, the application container 105 can infer an identity to select 940 as the workspace participant. For example, the application container 105 can use the application container's 105 host's location, network address, identity, or other information to infer that a particular workspace participant should be selected 940 as the current participant. For example, a public kiosk can present the application container 105, and any user of that kiosk can be with a common workspace participant identity to select 940 a public identity as the current participant.

The current participant's permissions are then determined 950 based on a role associated with the current participant (e.g., a workspace role). In some implementations, the roles associated with the current participant can include roles for workspace authors, readers, editors, reviewers, distributors, and/or other roles that have differing permissions for reading, creating, deleting, editing, sharing, and/or other operations that can be performed to a workspace and/or its content.

Figure 10:
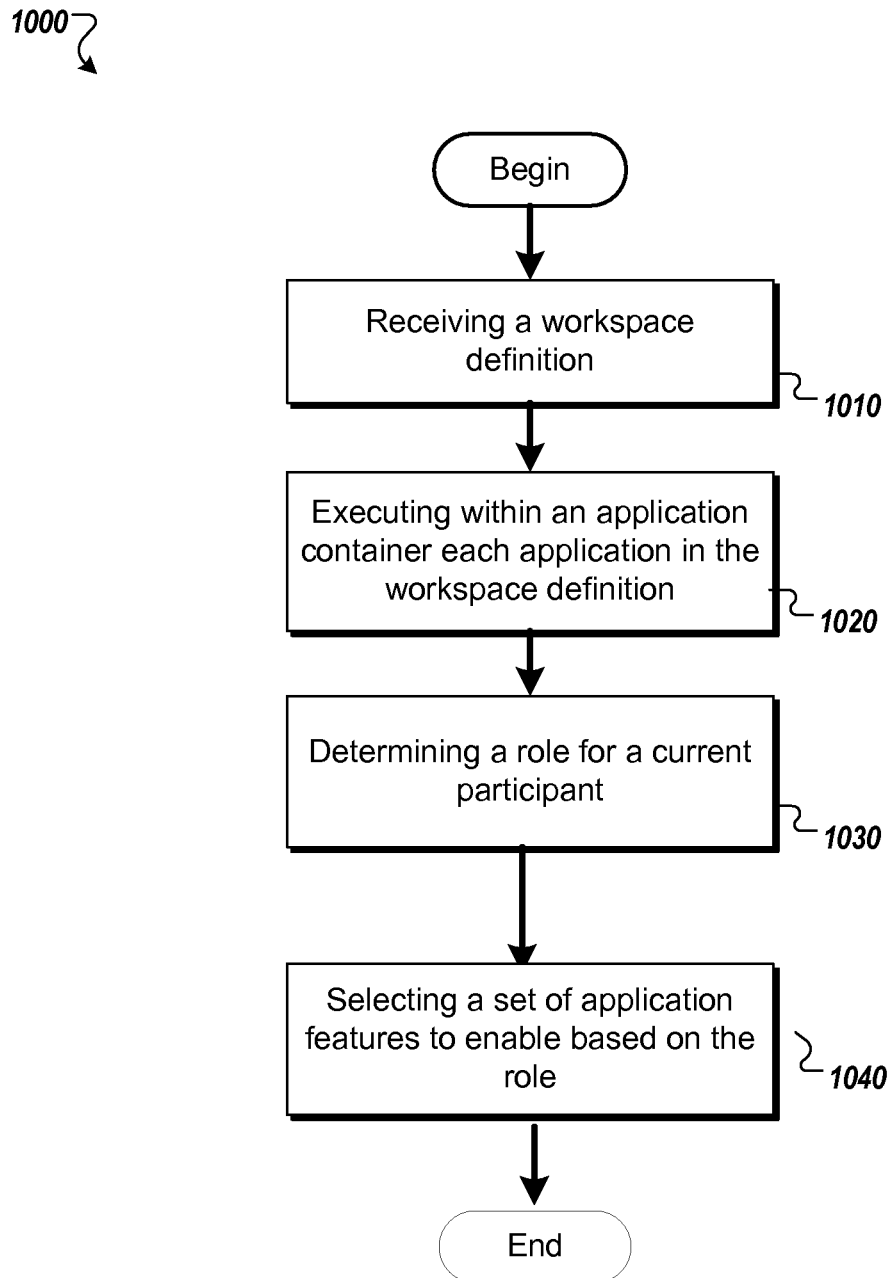
FIG. 10 is a flow chart that illustrates an example process for selectively enabling the features of an application.

FIG. 10 is a flow chart that illustrates an example process 1000 for selectively enabling the features of an application (e.g., one of the applications 120-130) for authorized users. The process 1000 begins when a workspace definition (e.g., the workspace definition 600) is received 1010 by the application container 105. The workspace definition 105 includes a collection of one or more application identifiers that can be used to identify applications that are to be executed by the application container 105 in association with the workspace 100.

Each application identified in the workspace definition 600 is executed 1020 within the application container 105. The application container determines 1030 a role for a current workspace participant. Based on the determined role, a set of application features are enabled 1040.

In some implementations, the set of enabled features can exclude features such as the abilities to save, print, update, retain the application's state, and/or other features. In some implementations, the subset of features can include a restriction on the amount of time the application will execute before shutting down, the size data sets and/or query results, the accuracy of data, or other aspects of the application that can be adjusted to make its operation less valuable than that of a fully enabled application.

In some implementations, the authorization of the participant can be performed to confirm that the user has purchased, subscribed, or has otherwise been given permission to fully utilize an application. For example, non-authorized users may be given limited access to a program's features to let them try the application in a limited manner before paying for it. In some implementations, applications that can present non-authorized users with a subset of features can be called "trial-ware", "cripple-ware", "demo-ware", or other such names to denote an ability for users to try an application before purchasing or otherwise becoming authorized to use the application's full feature set.

The application container and/or the application can accept input to enable additional application features. For example, the user can enter a credit card, a user name, or other form identification into the application to start a software subscription that authorizes the user to take advantage of all the application's features. In another example, the user can enter a license key, serial number, PIN, password, or other form of "unlock" code enable additional application features. In some implementations, the application container 105 and or the application can communicate with a service associated with the owner of the application to enable the additional application features. For example, payment information can be sent to a commerce server, and in response the commerce server can provide payment to the application's owner and an unlock code to the user.

Figure 11:
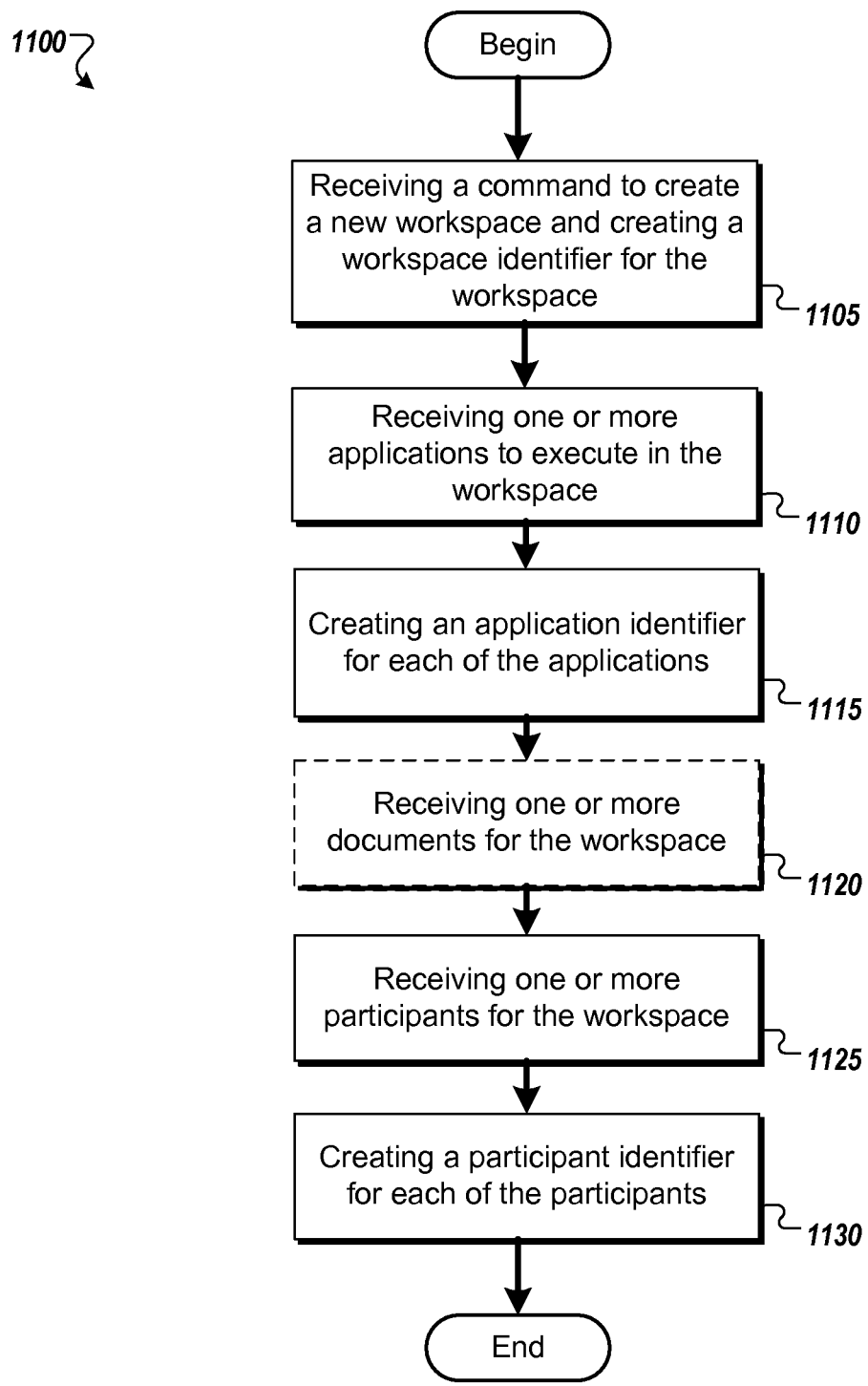
FIG. 11 is a flow diagram of an example process for the creation of a workspace definition.

FIG. 11 is a flow diagram of an example process 1100 for the creation of a workspace definition (e.g., the workspace definition 600). The process 1100 begins when the application container 105 receives 1105 a command to create a new workspace and creates a workspace identifier for the workspace. In some implementations, the command to create a new workspace can come from the user through an interaction with controls in the application container 105. For example, the user can activate the new workspace control 465 to initialize the creation of a new workspace.

One or more applications are received 1110 to execute in the workspace. For example, the user can select applications from the catalog 400 for inclusion in the workspace. An application identifier is created 1115 for each of the applications. For example, an application can be added to the workspace by creating an application identifier entry in the workspace's definition, wherein the application identifier can refer to the selected application.

One or more documents (e.g., electronic files) are received 1120 for inclusion in the workspace. For example, the user can select documents from a local or shared file repository for inclusion in the workspace. A document identifier is created for each of the documents. For example, a document can be added to the workspace by creating a document identifier entry in the workspace's definition, wherein the document identifier can refer to the selected document.

One or more participants are received 1125 to identify users of the workspace. A workspace participant identifier is created 1130 for each of the workspace participants. For example, a workspace participant can be added to the workspace by creating a participant identifier entry in the workspace's definition, wherein the participant identifier can refer to the selected participant.

Figure 12A:
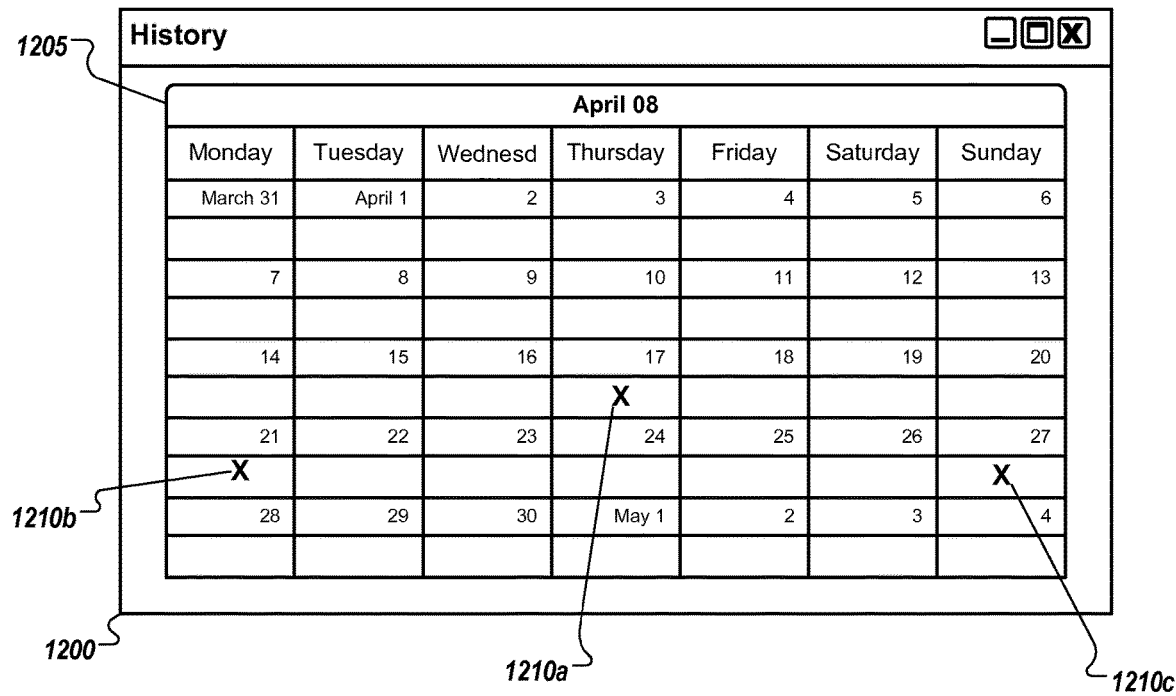
FIG. 12A illustrates an example history recall tool.

FIG. 12A illustrates an example history recall tool 1200. Generally speaking, the user can activate the history recall interface 1200 by pressing the history button 160. The history recall interface 1200 can be used to select a date and/or time. The application container 105 can determine the state of the workspace 100 at the selected time and/or date by searching the history record to recall the state of the workspace 100 at the selected point in time. The application container 100 can use the recalled state to cause the visual representation of the workspace 100 to appear as it did at the selected date and/or time.

In the illustrated example, the calendar control 1205 includes a collection state change indicators 1210a, 1210b, and 1210c. The state change indicators 1210a-1210c visually indicate the dates and/or times at which the history record indicates that the workspace 100 had been previously changed. For example, by selecting the state change indicator 1210a, the user can cause the workspace to appear as it did on Apr. 17, 2008.

Figure 12B:
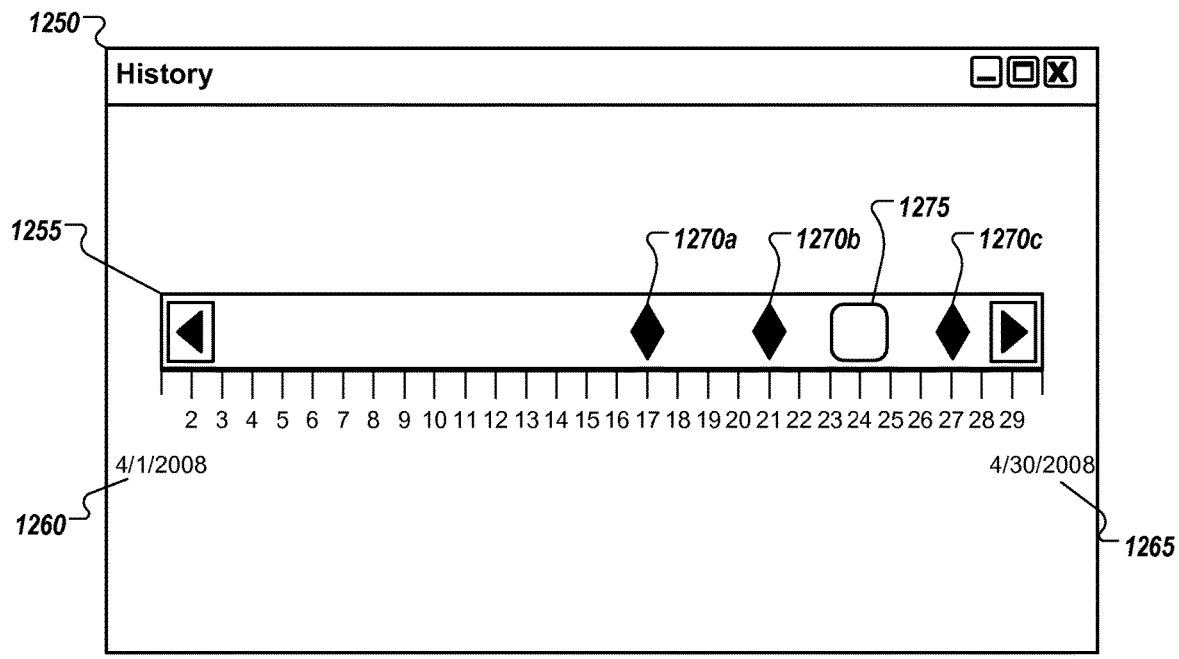
FIG. 12B illustrates another example history recall tool.

FIG. 12B illustrates another example history recall interface 1250. The history recall interface 1250 includes a slider control 1255. In the illustrated example, the slider control 1255 visually represents a range of time between a starting date 1260 and an ending date 1265. The interface 1250 includes a collection of state change indicators 1270a, 1270b, and 1270c. The state change indicators 1270a-1270c visually indicate the dates and/or times at which the history record indicates that the workspace 100 had been previously changed.

The slider control 1255 also includes a thumb 1275. The thumb 1275 is an element of the slider control 1255 that the user can manipulate along the length of the slider control 1255. By moving the thumb 1275, the user can indicate a date and/or time in the range between the starting date 1260 and the ending date 1265.

In the illustrated example, the thumb 1275 is positioned to indicate that the user wishes to have the visual representation of the workspace 100 to appear as it did on Apr. 24, 2008. By positioning the thumb at the Apr. 24, 2008 position, the user can cause the application container 105 to determine the state of the workspace 100 from the history record. As is indicated by the state change indicator 1270b, the workspace's 100 state on Apr. 24, 2008 was the state saved on Apr. 21, 2008.

The history recall interface 1200 includes a calendar control 1205.

For example, by pressing the history button 160 a history user interface that presents a calendar control can appear, and by selecting a date the user can cause the workspace 100 to appear as it did on that date. In another example, the history user interface may present a slider control that represents a history timeline of the workspace 100, and by sliding the control back and forth the user can cause the workspace 100 to revert back to various older versions of itself.

In some implementations, the history record can be saved as a file separate from the workspace 100 definition. In some implementations, the history record can be saved as part of the workspace 100 definition. For example, by saving the history record as part of the workspace 100 definition, the history of the workspace 100 can be distributed along with the workspace 100 definition. In another example, by saving the history record separately from the workspace 100 definition, the history record can be unique to an individual user, and/or permit the history record to span among multiple versions of the workspace 100.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, computing device. The computer readable medium can be a machine-readable storage device, a machine-readable storage substrate, a memory device, or a combination of one or more of them. The term "computing device" encompasses all apparatus, devices, and machines for processing data, including by way of example a programmable processor, a computer, a digital media player, an electronic game, a mobile phone, or multiple processors or computers, or combinations of these. The computing device can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A non-transitory computer readable medium comprising a workspace definition, the workspace definition including:
   a workspace identifier that identifies a workspace that is configured to be instantiated by an application container executing at a client system, wherein the application container manages a user interface having features defined by the workspace definition;
   an application identifier that refers to an application provider server that is external to the client system and an application hosted at the application provider server, wherein the application, when transferred to and executed in the application container, creates a visual representation in the user interface;
   workspace state information defining a public workspace view and a private workspace view, wherein the public workspace view defines a first size and first location of the visual representation, and wherein the private workspace view defines a second size and second location of the visual representation; and
   a plurality of participant identifiers, each referring to a workspace participant, wherein a first subset of the workspace participants is authorized to instantiate the workspace using only the public workspace view, and wherein a second subset of the workspace participants is authorized to instantiate the workspace using the private workspace view,
   wherein the workspace definition identifies a plurality of documents which are accessible through the user interface, and further stores an image that previews at least one of the plurality of documents.

2. The non-transitory computer readable medium of claim 1, wherein the second subset of the workspace participants is further authorized to lock the workspace definition such that the workspace cannot be subsequently modified.

3. The non-transitory computer readable medium of claim 1, wherein the workspace state information separately defines the public workspace view and the private workspace view for each of multiple applications.

4. The non-transitory computer readable medium of claim 1, wherein each workspace participant is associated with a respective role that defines a set of actions which the corresponding workspace participant is authorized to take with respect to the workspace definition.

5. The non-transitory computer readable medium of claim 1, wherein each workspace participant is associated with authentication information stored on an authentication server that is external to the client system.

6. The non-transitory computer readable medium of claim 1, wherein the application is configured to render a particular one of the plurality of documents.

7. The non-transitory computer readable medium of claim 1, wherein the workspace definition further includes at least one of the plurality of documents which are accessible through the user interface.

8. The non-transitory computer readable medium of claim 1, wherein:
the application is configured to render a particular one of the plurality of documents; and
the application is different than an application that created the particular one of the plurality of documents.

9. A computer-implemented method comprising:
receiving, at a client system, a workspace definition comprising
a workspace identifier that identifies a workspace that is configured to be instantiated by an application container executing at the client system, wherein the application container manages a user interface having features defined by the workspace definition,
an application identifier that refers to an application provider server that is external to the client system and an application hosted at the application provider server, wherein the application, when transferred to and executed in the application container, creates a visual representation in the user interface,
workspace state information defining a public workspace view and a private workspace view, wherein the public workspace view defines a first size and first location of the visual representation, and wherein the private workspace view defines a second size and second location of the visual representation, and
a plurality of participant identifiers, each referring to a workspace participant, wherein a first subset of the workspace participants is authorized to instantiate the workspace using only the public workspace view, and wherein a second subset of the workspace participants is authorized to instantiate the workspace using the private workspace view,
wherein the workspace definition identifies a plurality of documents which are accessible through the user interface, and further stores an image that previews at least one of the plurality of documents; and
in response to receiving the workspace definition at the client system, instantiating, by the application container, the workspace identified by the workspace identifier.

10. The computer-implemented method of claim 9, further comprising enabling a set of application features in the application based on a role of a particular workspace participant identified by one of the participant identifiers.

11. The computer-implemented method of claim 9, further comprising:
authenticating a particular workspace participant identified by at least one of the participant identifiers to lock the workspace definition such that it cannot be modified after the workspace definition has been sent to a workspace server; and
sending the workspace definition to the workspace server.

12. The computer-implemented method of claim 9, wherein the workspace definition is received from a workspace server that is external to both the client system and the application provider server.

13. The computer-implemented method of claim 9, further comprising executing the application in the application container.

14. The computer-implemented method of claim 9, further comprising:
executing the application in the application container; and
authorizing a particular workspace participant identified by one of the participant identifiers to access the visual representation.

15. A client system comprising:
a display device;
a computer readable medium including a program product; and
one or more processors configured to interact with the display device, execute the program product and perform operations comprising:
receiving, at the client system, a workspace definition comprising
a workspace identifier that identifies a workspace that is configured to be instantiated by an application container executing at the client system, wherein the application container manages a user interface having features defined by the workspace definition,
an application identifier that refers to an application provider server that is external to the client system and an application hosted at the application provider server, wherein the application, when transferred to and executed in the application container, creates a visual representation in the user interface,
workspace state information defining a public workspace view and a private workspace view, wherein the public workspace view defines a first size and first location of the visual representation, and wherein the private workspace view defines a second size and second location of the visual representation, and
a plurality of participant identifiers, each referring to a workspace participant, wherein a first subset of the workspace participants is authorized to instantiate the workspace using only the public workspace view, and wherein a second subset of the workspace participants is authorized to instantiate the workspace using the private workspace view,
wherein the workspace definition identifies a plurality of documents which are accessible through the user interface, and further stores an image that previews at least one of the plurality of documents; and
in response to receiving the workspace definition at the client system, instantiating the workspace identified by the workspace identifier.

16. The client system of claim 15, wherein the operations further comprise executing the application in the application container.

17. The client system of claim 15, wherein the operations further comprise:
   executing the application in the application container; and
   authorizing a particular workspace participant identified by one of the participant identifiers to access the visual representation.

18. The client system of claim 15, wherein the one or more processors are further configured to perform operations comprising:
   authenticating a particular workspace participant identified by at least one of the participant identifiers to lock the workspace definition such that it cannot be modified after the workspace definition has been sent to a workspace server; and
   sending the workspace definition to the workspace server.

19. The client system of claim 15, wherein the workspace definition is received from a workspace server that is external to both the client system and the application provider server.

20. The client system of claim 15, wherein the application is configured to render a particular one of the plurality of documents.

* * * * *